(12) United States Patent
Kim et al.

(10) Patent No.: US 12,061,346 B2
(45) Date of Patent: Aug. 13, 2024

(54) IMAGE SENSOR INCLUDING COLOR SEPARATING LENS ARRAY AND ELECTRONIC APPARATUS INCLUDING THE IMAGE SENSOR

(71) Applicant: SAMSUNG ELECTRONICS CO., LTD., Suwon-si (KR)

(72) Inventors: Seaum Kim, Uiwang-si (KR); Hongkyu Park, Yongin-si (KR); Seokho Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 84 days.

(21) Appl. No.: 18/076,943

(22) Filed: Dec. 7, 2022

(65) Prior Publication Data

US 2023/0176391 A1 Jun. 8, 2023

(30) Foreign Application Priority Data

Dec. 7, 2021 (KR) .......................... 10-2021-0174020

(51) Int. Cl.
*G02B 27/10* (2006.01)
*G02B 27/12* (2006.01)
(Continued)

(52) U.S. Cl.
CPC ....... *G02B 27/1013* (2013.01); *G02B 27/123* (2013.01); *H04N 23/12* (2023.01); *H04N 23/60* (2023.01)

(58) Field of Classification Search
CPC .. G02B 27/1013; G02B 27/123; H04N 23/12; H04N 23/60
(Continued)

(56) References Cited

U.S. PATENT DOCUMENTS

| 6,670,105 B2 | 12/2003 | Terada et al. |
| 2009/0250594 A1 | 10/2009 | Tanaka et al. |

(Continued)

FOREIGN PATENT DOCUMENTS

| EP | 3 812 803 A1 | 4/2021 |
| JP | 3576885 B2 | 10/2004 |

(Continued)

OTHER PUBLICATIONS

Communication dated Jun. 16, 2023 issued by the Korean Patent Office in counterpart Korean Application No. 10-2021-0174020.
(Continued)

*Primary Examiner* — Joel W Fosselman
(74) *Attorney, Agent, or Firm* — Sughrue Mion, PLLC

(57) ABSTRACT

An image sensor includes: a sensor substrate including a plurality of first pixels and a plurality of second pixels; a spacer layer on the sensor substrate; and a color separating lens array on the spacer layer and changing condensing light of a first wavelength on each of the first pixels and condensing light of a second wavelength on each of the second pixels. The color separating lens array includes a first color separating lens array layer including a plurality of first nanoposts, a first dielectric material layer arranged among the plurality of first nanoposts, and a plurality of first etch prevention patterns arranged respectively under the plurality of first nanoposts.

19 Claims, 51 Drawing Sheets

(51) Int. Cl.
*H04N 23/12* (2023.01)
*H04N 23/60* (2023.01)

(58) Field of Classification Search
USPC .......................................................... 348/302
See application file for complete search history.

(56) References Cited

U.S. PATENT DOCUMENTS

| | | | |
|---|---|---|---|
| 2017/0090206 A1* | 3/2017 | Kim | ................. H01L 27/14627 |
| 2017/0133429 A1 | 5/2017 | Cheng et al. | |
| 2017/0141150 A1 | 5/2017 | Park et al. | |
| 2018/0098038 A1 | 4/2018 | Yun et al. | |
| 2018/0224574 A1 | 8/2018 | Lee et al. | |
| 2018/0240653 A1 | 8/2018 | Akselrod et al. | |
| 2020/0098814 A1 | 3/2020 | Yang | |
| 2021/0126035 A1 | 4/2021 | Roh et al. | |
| 2022/0137267 A1 | 5/2022 | Park et al. | |

FOREIGN PATENT DOCUMENTS

| | | |
|---|---|---|
| JP | 2009-252978 A | 10/2009 |
| KP | 10-2016-0004641 A | 1/2016 |
| KR | 10-2017-0038524 A | 4/2017 |
| KR | 10-2018-0090613 A | 8/2018 |
| KR | 10-2018-0110260 A | 10/2018 |
| KR | 10-2219704 B1 | 2/2021 |
| KR | 10-2021-0048401 A | 5/2021 |
| WO | 2021/111300 A1 | 6/2021 |

OTHER PUBLICATIONS

Communication dated Dec. 13, 2023, issued by the Korean Intellectual Property Office in Korean Patent Application No. 10-2021-0174020.

* cited by examiner

FIG. 2B

| C | M | C | M | C | M | C | M |
|---|---|---|---|---|---|---|---|
| Y | G | Y | G | Y | G | Y | G |
| C | M | C | M | C | M | C | M |
| Y | G | Y | G | Y | G | Y | G |
| C | M | C | M | C | M | C | M |
| Y | G | Y | G | Y | G | Y | G |
| C | M | C | M | C | M | C | M |
| Y | G | Y | G | Y | G | Y | G |

FIG. 2C

| R | G | R | G | R | G | R | G |
|---|---|---|---|---|---|---|---|
| B | W | B | W | B | W | B | W |
| R | G | R | G | R | G | R | G |
| B | W | B | W | B | W | B | W |
| R | G | R | G | R | G | R | G |
| B | W | B | W | B | W | B | W |
| R | G | R | G | R | G | R | G |
| B | W | B | W | B | W | B | W |

IMAGE SENSOR INCLUDING COLOR SEPARATING LENS ARRAY AND ELECTRONIC APPARATUS INCLUDING THE IMAGE SENSOR

CROSS-REFERENCE TO RELATED APPLICATION

This application is based on and claims priority under 35 U.S.C. § 119 to Korean Patent Application No. 10-2021-0174020, filed on Dec. 7, 2021, in the Korean Intellectual Property Office, the disclosure of which is incorporated by reference herein in its entirety.

BACKGROUND

1. Field

Provided are an image sensor including a color separating lens array capable of focusing incident light separately according to wavelengths of the incident light, and an electronic apparatus including the image sensor.

2. Description of the Related Art

Image sensors generally sense the color of incident light by using a color filter. However, a color filter may have low light utilization efficiency because the color filter absorbs light of colors other than the intended color of light. For example, when a red-green-blue (RGB) color filter is used, only ⅓ of the incident light is transmitted therethrough and the other part of the incident light, that is, ⅔ of the incident light, is absorbed. Thus, the light utilization efficiency is only about 33%. Thus, in a color display apparatus or a color image sensor, most light loss occurs in the color filter.

SUMMARY

Provided are an image sensor having improved light utilization efficiency due to use of a color separating lens array capable of focusing incident light separately according to wavelengths of the incident light, and an electronic apparatus including the image sensor.

Additional aspects will be set forth in part in the description which follows and, in part, will be apparent from the description, or may be learned by practice of the presented example embodiments of the disclosure.

According to an aspect of the disclosure, there is provided an image sensor including: a sensor substrate including a plurality of first pixels configured to sense light of a first wavelength and a plurality of second pixels configured to sense light of a second wavelength that is different from the first wavelength; a spacer layer that is transparent and provided on the sensor substrate; and a color separating lens array provided on the spacer layer, the color separating lens array configured to change a phase of the light of the first wavelength and condense the light of the first wavelength on each of the first pixels, and change a phase of the light of the second wavelength and condense the light of the second wavelength on each of the second pixels, wherein the color separating lens array includes a first color separating lens array layer including a plurality of first nanoposts, a first dielectric material layer provided between the plurality of first nanoposts, and a plurality of first etch prevention patterns provided respectively under the plurality of first nanoposts, and wherein the first dielectric material layer includes a first dielectric material having a lower refractive index than the plurality of first nanoposts.

A first etch prevention pattern, among the plurality of first etch prevention patterns, may be provided between a first nanopost, among the plurality of first nanoposts, corresponding to the first etch prevention pattern and the spacer layer.

Each of the plurality of first etch prevention patterns may have a thickness of about 3 nm to about 50 nm.

Each of the plurality of first etch prevention patterns may have a thickness of about 5 nm to about 15 nm.

A first width or a first diameter of a first etch prevention pattern, among the plurality of first etch prevention patterns, may be greater than a second width or a second diameter of a lower portion of a first nanopost, among the plurality of first nanoposts, corresponding to the first etch prevention pattern.

The first width or the first diameter of the first etch prevention pattern may be about 100 nm to about 500 nm.

The first width or the first diameter of the first etch prevention pattern may be about 1.2 to 2 times greater than the second width or the second diameter of the lower portion of the first nanopost corresponding to the first etch prevention pattern.

Each of the first etch prevention patterns may include at least one material selected from aluminum oxide (AlO), hafnium oxide (HfO), or silicon nitride (SiN).

An upper surface of the spacer layer may be in direct contact with a lower surface of the first dielectric material layer between two adjacent first etch prevention patterns among the plurality of first etch prevention patterns.

The color separating lens array may further include a second color separating lens array layer provided on the first color separating lens array layer, wherein the second color separating lens array layer includes a plurality of second nanoposts, and a second dielectric material layer provided between the plurality of second nanoposts, the second dielectric material layer including a second dielectric material having a lower refractive index than the plurality of second nanoposts, and wherein arrangement of the plurality of first nanoposts in the first color separating lens array layer is different from arrangement of the plurality of second nanoposts in the second color separating lens array layer.

The color separating lens array may further include a plurality of second etch prevention patterns provided on the first color separating lens array layer and respectively under the plurality of second nanoposts.

A third width or a third diameter of a second etch prevention pattern, among the plurality of second etch prevention patterns, may be about 1.2 to about 2 times greater than a fourth width or a fourth diameter of a second nanopost, among the plurality of second nanoposts, corresponding to the second etch prevention pattern.

An upper surface of a first nanopost, among the plurality of first nanoposts, on which a second nanopost, among the plurality of second nanoposts, may be not provided, is in direct contact with the second dielectric material layer.

At least one second nanopost of the plurality of second nanoposts may be shifted in a lateral direction with respect to corresponding one or more first nanoposts, among the plurality of first nanoposts.

A second etch prevention pattern, among the plurality of second etch prevention patterns, may be shifted in a lateral direction with respect to a first nanopost, among the plurality of first nanoposts, corresponding a second nanopost, among the plurality of second nanoposts, provided on the second etch prevention pattern, and partially covers an upper surface of the first nanopost under the second etch prevention pattern.

A second etch prevention pattern, among the plurality of second etch prevention patterns, may completely cover an upper surface of a first nanopost, among the plurality of first nanoposts, corresponding a second nanopost, among the plurality of second nanoposts, provided on the second etch prevention pattern.

The color separating lens array may further include a plurality of second etch prevention patterns provided on the first color separating lens array layer, and the plurality of second etch prevention patterns are respectively provided under the plurality of second nanoposts and on upper surfaces of the plurality of first nanoposts.

A fifth width or a fifth diameter of a second etch prevention pattern, from among the plurality of second etch prevention patterns, on which a second nanopost, among the plurality of second nanoposts, is not arranged is about 1.2 to about 2 times greater than a sixth width or a sixth diameter of an upper portion of a first nanopost, among the plurality of first nanoposts, provided under the second etch prevention pattern.

The image sensor may further include an anti-reflection layer on the color separating lens array.

The anti-reflection layer includes SiO2 and may have a thickness of about 80 nm to about 120 nm.

The anti-reflection layer may include a first anti-reflection layer provided on the color separating lens array and a second anti-reflection layer provided on the first anti-reflection layer, and the first anti-reflection layer and the second anti-reflection layer include different dielectric materials from each other.

The first anti-reflection layer may include Si3N4 having a thickness of about 20 nm to about 60 nm and the second anti-reflection layer includes SiO2 having a thickness of about 80 nm to about 120 nm.

According to another aspect of the disclosure, there is provided an electronic apparatus including: an image sensor configured to convert an optical image into an electrical signal; a processor configured to control operations of the image sensor and to store and output a signal generated by the image sensor; and a lens assembly configured to provide light from an object to the image sensor, wherein the image sensor includes: a sensor substrate including a plurality of first pixels configured to sense light of a first wavelength and a plurality of second pixels configured to sense light of a second wavelength that is different from the first wavelength; a spacer layer that is transparent and provided on the sensor substrate; and a color separating lens array provided on the spacer layer, the color separating lens array configured to change a phase of the light of the first wavelength and condense the light of the first wavelength on each of the first pixels, and change a phase of the light of the second wavelength and condense the light of the second wavelength on each of the second pixels, wherein the color separating lens array includes a first color separating lens array layer including a plurality of first nanoposts, a first dielectric material layer provided between the plurality of first nanoposts, and a plurality of first etch prevention patterns provided respectively under the plurality of first nanoposts, and wherein the first dielectric material layer includes a first dielectric material having a lower refractive index than the plurality of first nanoposts.

BRIEF DESCRIPTION OF THE DRAWINGS

The above and other aspects, features, and advantages of certain example embodiments of the disclosure will be more apparent from the following description taken in conjunction with the accompanying drawings, in which:

FIGS. 2A to 2C are diagrams showing examples of various pixel arrangements in a pixel array of an image sensor;

DETAILED DESCRIPTION

Figure 1:
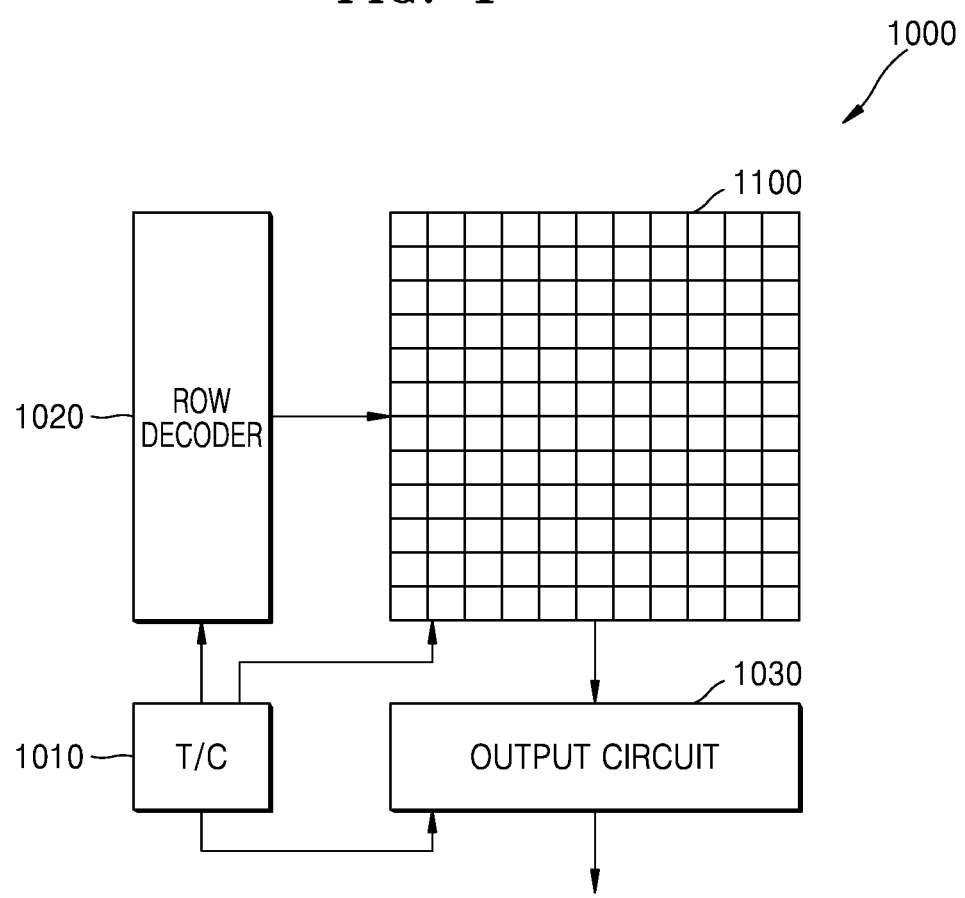
FIG. 1 is a schematic block diagram of an image sensor according to an example embodiment.

Reference will now be made in detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, an image sensor including a color separating lens array and an electronic apparatus including the image sensor will be described in detail with reference to accompanying drawings. The example embodiments of the disclosure are capable of various modifications and may be embodied in many different forms. In the drawings, like reference numerals denote like components, and sizes of components in the drawings may be exaggerated for convenience of explanation.

When a layer, a film, a region, or a panel is referred to as being "on" another element, it may be directly on/under/at left/right sides of the other layer or substrate, or intervening layers may also be present.

It will be understood that although the terms "first," "second," etc. may be used herein to describe various components, these components should not be limited by these terms. These components are only used to distinguish one component from another. These terms do not limit that materials or structures of components are different from one another.

An expression used in the singular encompasses the expression of the plural, unless it has a clearly different meaning in the context. It will be further understood that when a portion is referred to as "comprises" another component, the portion may not exclude another component but may further comprise another component unless the context states otherwise.

In addition, the terms such as " . . . unit", "module", etc. provided herein indicates a unit performing at least one function or operation, and may be realized by hardware, software, or a combination of hardware and software.

The use of the terms of "the above-described" and similar indicative terms may correspond to both the singular forms and the plural forms.

Also, the steps of all methods described herein may be performed in any suitable order unless otherwise indicated herein or otherwise clearly contradicted by context. Also, the use of all exemplary terms (for example, etc.) is only to describe a technical spirit in detail, and the scope of rights is not limited by these terms unless the context is limited by the claims.

FIG. 1 is a block diagram of an image sensor 1000 according to an example embodiment. Referring to FIG. 1, the image sensor 1000 may include a pixel array 1100, a timing controller 1010, a row decoder 1020, and an output circuit 1030. The image sensor 1000 may include a charge-coupled device (CCD) image sensor or a complementary metal oxide semiconductor (CMOS) image sensor.

The pixel array 1100 includes pixels that are two-dimensionally arranged in a plurality of rows and columns. The row decoder 1020 selects one of the rows in the pixel array 1100 in response to a row address signal output from the timing controller 1010. The output circuit 1030 outputs a photosensitive signal, in a column unit, from a plurality of pixels arranged in the selected row. To this end, the output circuit 1030 may include a column decoder and an analog-to-digital converter (ADC). For example, the output circuit 1030 may include a column decoder and a plurality of ADCs disposed respectively for the columns in the pixel array 1100 or one ADC disposed at an output end of the column decoder. The timing controller 1010, the row decoder 1020, and the output circuit 1030 may be implemented as one chip or in separate chips. A processor for processing an image signal output from the output circuit 1030 may be implemented as one chip with the timing controller 1010, the row decoder 1020, and the output circuit 1030.

The pixel array 1100 may include a plurality of pixels that sense light of different wavelengths. The pixel arrangement may be implemented in various ways. For example, FIGS. 2A to 2C show examples of various pixel arrangements in the pixel array 1100 of the image sensor 1000.

Figure 2A:
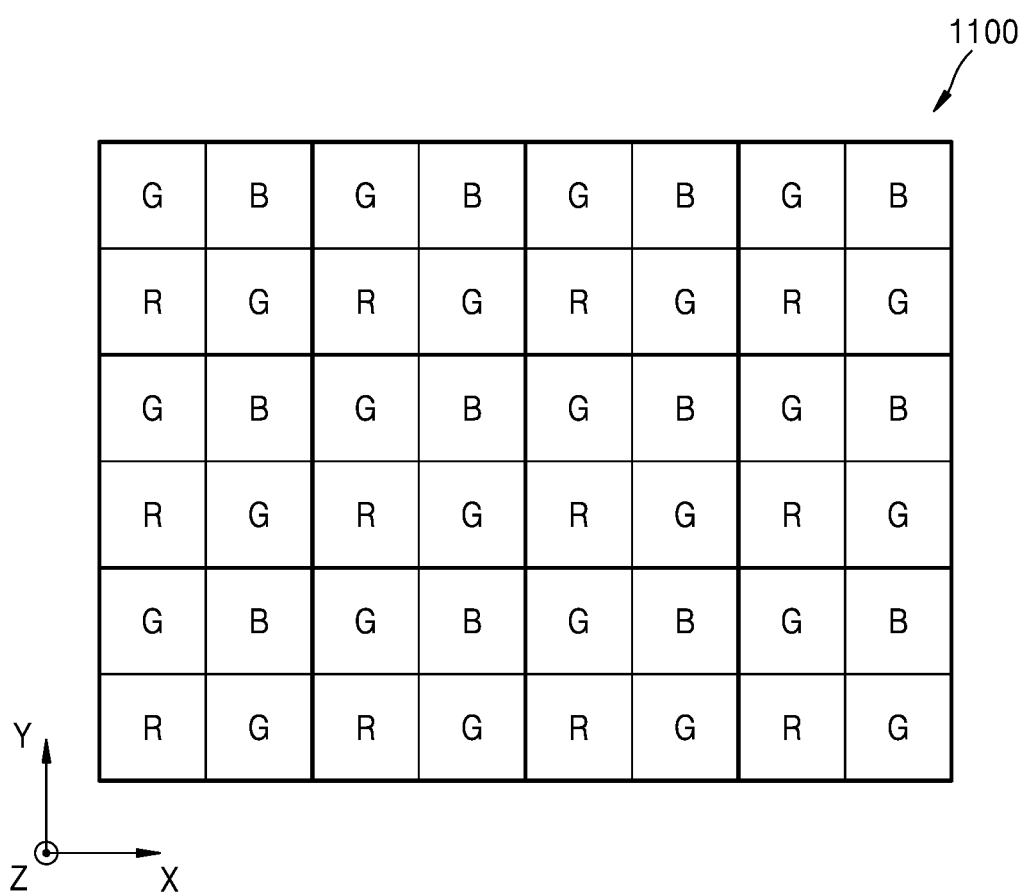

FIG. 2A shows a Bayer pattern that is generally adopted in the image sensor 1000. Referring to FIG. 2A, one unit pattern includes four quadrant regions, and first through fourth quadrants may be the blue pixel B, the green pixel G, the red pixel R, and the green pixel G, respectively. The unit patterns may be repeatedly and two-dimensionally arranged in a first direction (X direction) and a second direction (Y direction). In other words, two green pixels G are arranged in one diagonal direction and one blue pixel B and one red pixel R are arranged in another diagonal direction in a unit pattern of a 2×2 array. In the entire arrangement of pixels, a first row in which a plurality of green pixels G and a plurality of blue pixels B are alternately arranged in the first direction and a second row in which a plurality of red pixels R and a plurality of green pixels G are alternately arranged in the first direction are repeatedly arranged in a second direction.

The pixel array 1100 may be arranged in various arrangement patterns, rather than the Bayer pattern. For example, referring to FIG. 2B, a CYGM arrangement, in which a magenta pixel M, a cyan pixel C, a yellow pixel Y, and a green pixel G configure one unit pattern, may be used. Also, referring to FIG. 2C, an RGBW arrangement, in which a green pixel G, a red pixel R, a blue pixel, and a white pixel W configure one unit pattern, may be used. According to an example embodiment, the unit pattern may have a 3×2 array form. In addition to the above examples, the pixels in the pixel array 1100 may be arranged in various ways according to color characteristics of the image sensor 1000. Hereinafter, it will be described that the pixel array 1100 of the image sensor 1000 has a Bayer pattern, but the operating principles may be applied to other patterns of pixel arrangement than the Bayer pattern.

Figure 3A:
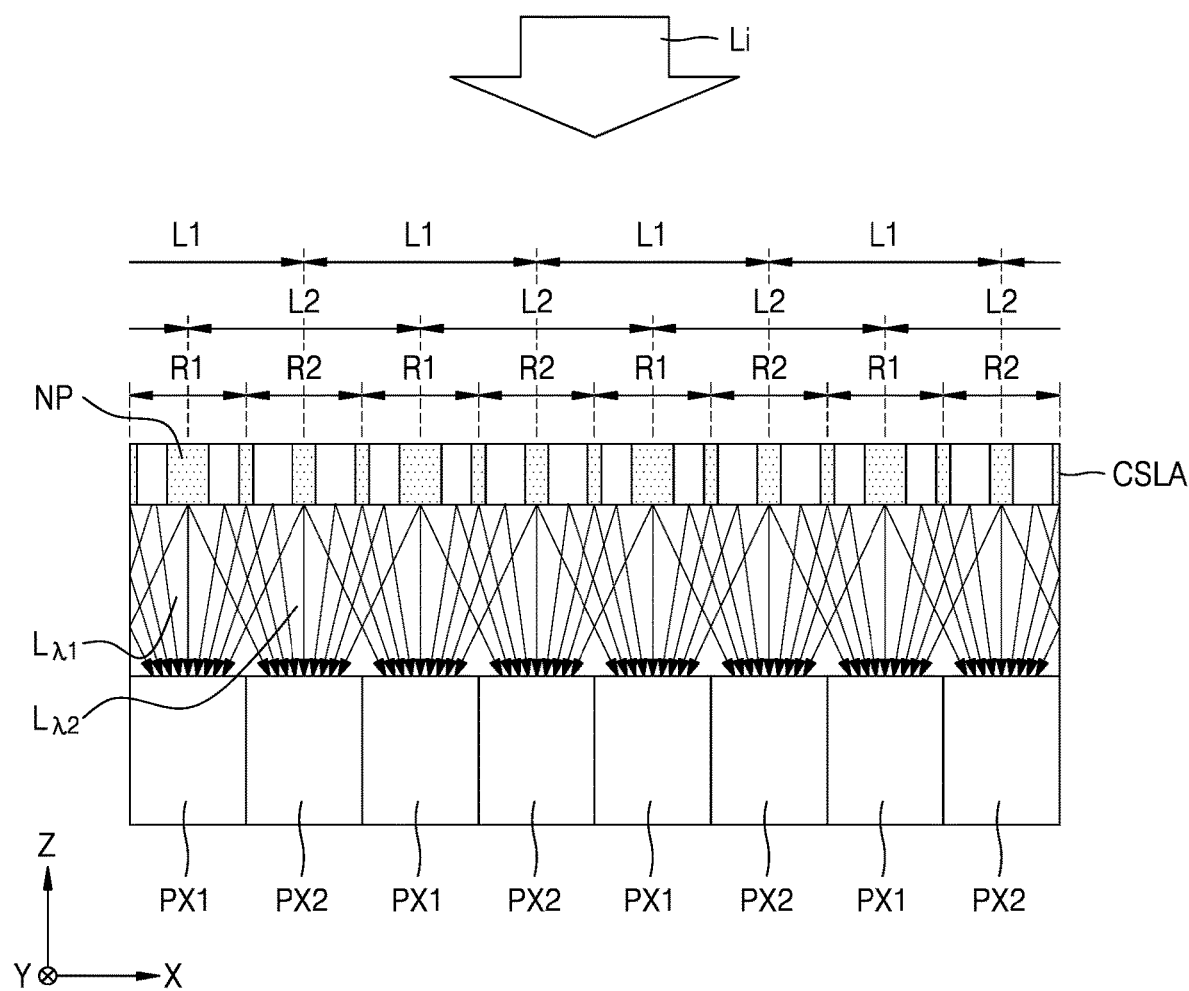
FIGS. 3A and 3B are conceptual diagrams showing a schematic structure and operations of a color separating lens array according to an example embodiment.
Figure 3B:
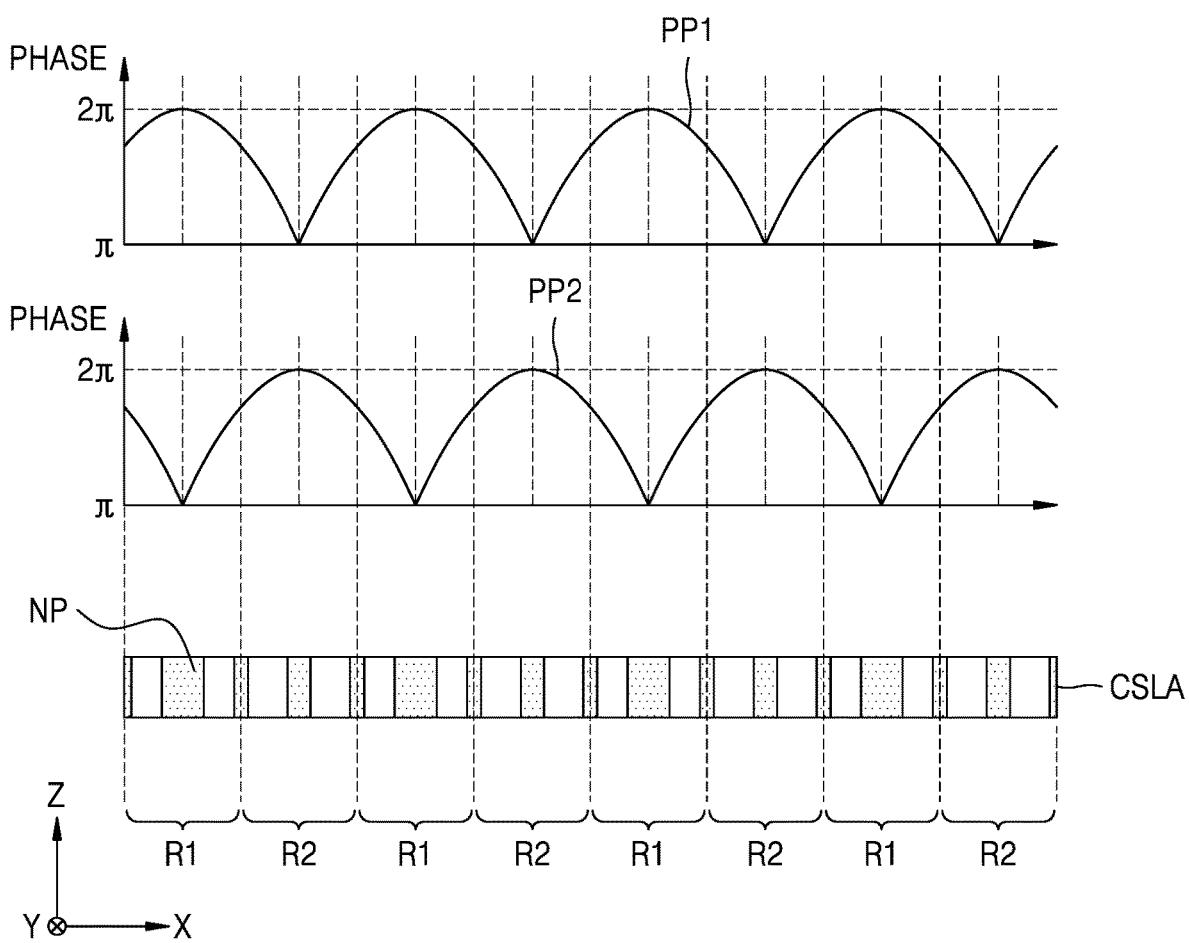

The pixel array 1100 of the image sensor 1000 may include a color separating lens array for condensing light of a color corresponding to each pixel. FIGS. 3A and 3B are conceptual diagrams showing a structure and operations of a color separating lens array according to an example embodiment.

Referring to FIG. 3A, a color separating lens array CSLA may include a plurality of nanoposts NP that change a phase of incident light Li differently from incident locations thereof. The color separating lens array CSLA may be partitioned in various ways. For example, the color separating lens array CSLA may be partitioned as a first pixel corresponding region R1 corresponding to a first pixel PX1 on which first wavelength light $L_{\lambda 1}$ included in the incident light Li is condensed, and a second pixel corresponding region R2 corresponding to a second pixel PX2 on which second wavelength light $L_{\lambda 2}$ included in the incident light Li is condensed. Each of the first and second pixel corresponding regions R1 and R2 may include one or more nanoposts NP, and the first and second pixel corresponding regions R1 and R2 may respectively face the first and second pixels PX1 and PX2. In another example, the color separating lens array CSLA may be partitioned as a first wavelength light condensing region L1 for condensing the first wavelength light $L_{\lambda 1}$ onto the first pixel PX1 and a second wavelength light condensing region L2 for condensing the second wavelength light $L_{\lambda 2}$ onto the second pixel PX2. The first and second wavelength light condensing regions L1 and L2 may partially overlap each other.

The color separating lens array CSLA may generate different phase profiles of the first wavelength light $L_{\lambda 1}$ and the second wavelength light $L_{\lambda 2}$ included in the incident light Li so that the first wavelength light $L_{\lambda 1}$ may be condensed onto the first pixel PX1 and the second wavelength light $L_{\lambda 2}$ may be condensed onto the second pixel PX2.

For example, referring to FIG. 3B, the color separating lens array CSLA may allow the first wavelength light $L_{\lambda 1}$ to have a first phase profile PP1 and the second wavelength light $L_{\lambda 2}$ to have a second phase profile PP2 at a position immediately after passing through the color separating lens array CSLA, e.g., on a lower surface of the color separating lens array CSLA, such that the first wavelength light $L_{\lambda 1}$ and the second wavelength light $L_{\lambda 2}$ may be respectively condensed on the corresponding first pixel PX1 and the second pixel PX2. In detail, the first wavelength light $L_{\lambda 1}$ that has passed through the color separating lens array CSLA may have the first phase profile PP1 that is largest at the center of the first pixel corresponding region R1 and reduces away from the center of the first pixel corresponding region R1, that is, toward the second pixel corresponding regions R2. Such a phase profile is similar to a phase profile of light converging to one point after passing through a convex lens, e.g., a micro-lens having a convex center in the first wavelength light condensing region L1, and the first wavelength light $L_{\lambda 1}$ may be condensed onto the first pixel PX1. Also, the second wavelength light $L_{\lambda 2}$ that has passed through the color separating lens array CSLA has the second phase profile PP2 that is largest at the center of the second pixel corresponding region R2 and reduces away from the center of the second pixel corresponding region R2, e.g., toward the first pixel corresponding regions R1, and thus, the second wavelength light $L_{\lambda 2}$ may be condensed onto the second pixel PX2.

Because a refractive index of a material varies depending on a wavelength of light, and as shown in FIG. 3B, the color separating lens array CSLA may provide different phase profiles with respect to the first and second wavelength light $L_{\lambda 1}$ and $L_{\lambda 2}$. In other words, because the same material has a different refractive index according to the wavelength of light reacting with the material and a phase delay of the light that passes through the material is different according to the wavelength, the phase profile may vary depending on the wavelength. For example, a refractive index of the first pixel corresponding region R1 with respect to the first wavelength light $L_{\lambda 1}$ and a refractive index of the first pixel corresponding region R1 with respect to the second wavelength light $L_{\lambda 2}$ may be different from each other, and the phase delay of the first wavelength light $L_{\lambda 1}$ that passed through the first pixel corresponding region R1 and the phase delay of the second wavelength light $L_{\lambda 2}$ that passed through the first pixel corresponding region R1 may be different from each other. Therefore, when the color separating lens array CSLA is designed based on the characteristics of light, different phase profiles may be provided with respect to the first wavelength light $L_{\lambda 1}$ and the second wavelength light $L_{\lambda 2}$.

The color separating lens array CSLA may include nanoposts NP that are arranged according to a certain rule such that the first and second wavelength light $L_{\lambda 1}$ and $L_{\lambda 2}$ may respectively have the first and second phase profiles PP1 and PP2. Here, the rule may be applied to parameters, such as the shape of the nanoposts NP, sizes (width and height), a distance between the nanoposts NP, and the arrangement form thereof, and these parameters may be determined according to a phase profile to be implemented by the color separating lens array CSLA.

A rule in which the nanoposts NP are arranged in the first pixel corresponding region R1, and a rule in which the nanoposts NP are arranged in the second pixel corresponding region R2 may be different from each other. In other words, sizes, shapes, intervals, and/or arrangement of the nanoposts NP in the first pixel corresponding region R1 may be different from those of the nanoposts NP in the second pixel corresponding region R2.

A cross-sectional diameter of the nanoposts NP may have sub-wavelength dimension. Here, the sub-wavelength refers to a wavelength that is less than a wavelength band of light to be branched. The nanoposts NP may have a dimension that is less than a shorter wavelength of the first wavelength and the second wavelength. When the incident light Li is a visible ray, the cross-sectional diameter of the nanoposts NP may be less than, for example, 400 nm, 300 nm, or 200 nm. In addition, a height of the nanoposts NP may be about 500 nm to about 1500 nm, which is greater than the cross-sectional diameter of the nanopost. According to an example embodiment, the nanoposts NP may be obtained by combining two or more posts stacked in a third direction, e.g., a height direction (Z direction).

The nanoposts NP may include a material having a higher refractive index than that of a peripheral material. For example, the nanoposts NP may include c-Si, p-Si, a-Si and a Group III-V compound semiconductor (GaP, GaN, GaAs etc.), SiC, $TiO_2$, SiN, and/or a combination thereof. The nanoposts NP having a different refractive index from the refractive index of the peripheral material may change the phase of light that passes through the nanoposts NP. This is caused by phase delay that occurs due to the shape dimension of the sub-wavelength of the nanoposts NP, and a degree at which the phase is delayed, may be determined by a detailed shape dimension and arrangement shape of the nanoposts NP. A peripheral material of the nanoposts NP may include a dielectric material having a less refractive index than that of the nanoposts NP. For example, the peripheral material may include $SiO_2$ or air.

A first wavelength λ1 and a second wavelength λ2 may be in a wavelength band of infrared rays and visible rays. However, one or more example embodiments are not limited thereto, and a variety of wavelength bands may be implemented according to the rule of arrays of the plurality of nanoposts NP. Also, two wavelengths are branched and condensed as an example. However, example embodiments are not limited thereto. The incident light may be branched into three directions or more according to wavelengths and condensed.

Also, the color separating lens array CSLA includes one single layer, but the color separating lens array CSLA may have a structure in which a plurality of layers are stacked.

Hereinafter, an example in which the color separating lens array CSLA described above is applied to the pixel array 1100 of the image sensor 1000 will be described in detail.

Figure 4A:
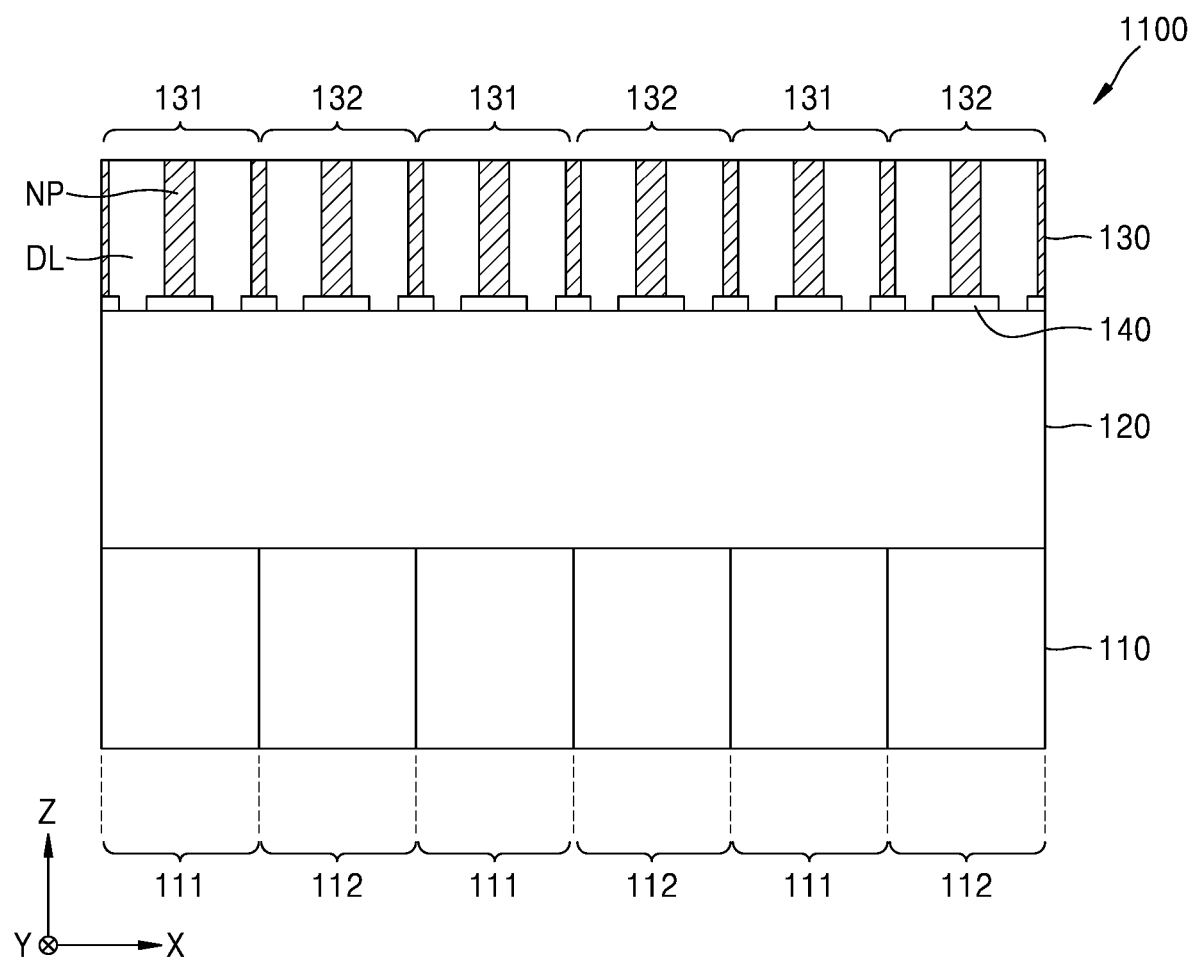
FIGS. 4A and 4B are cross-sectional views of a pixel array in an image sensor according to an example embodiment, seen from different cross-sections.
Figure 4B:
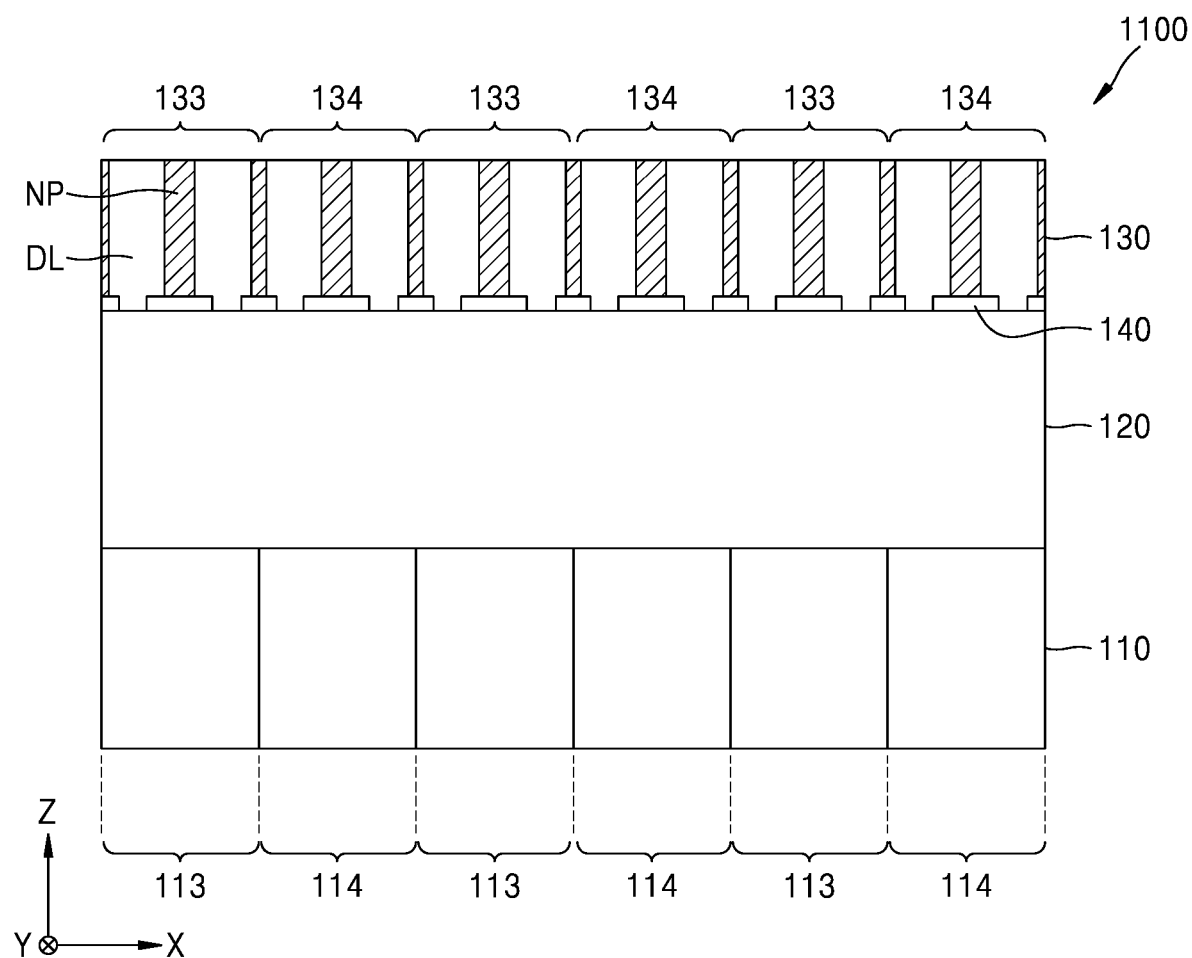
Figure 5A:
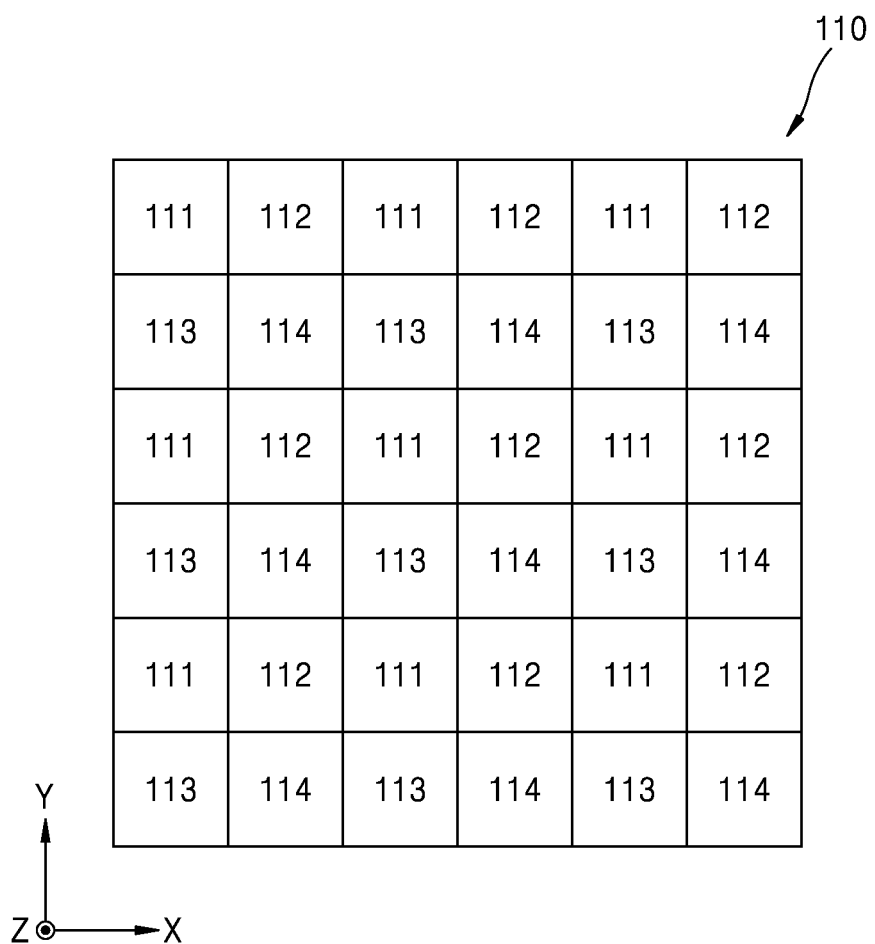
FIG. 5A is a plan view schematically showing pixel arrangement in a pixel array.
Figure 5B:
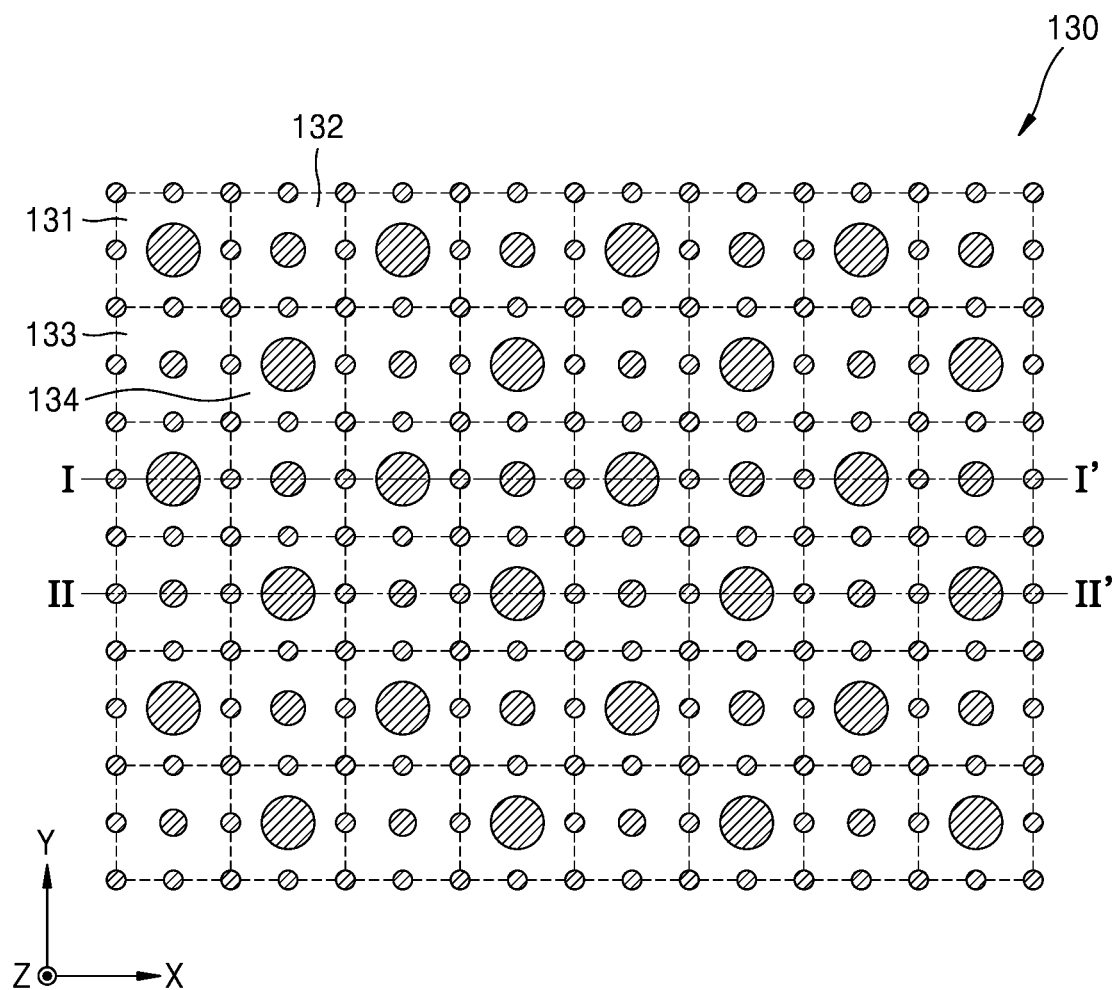
FIG. 5B is a plan view showing an example of arranging a plurality of nanoposts in a plurality of regions of a color separating lens array.
Figure 5C:
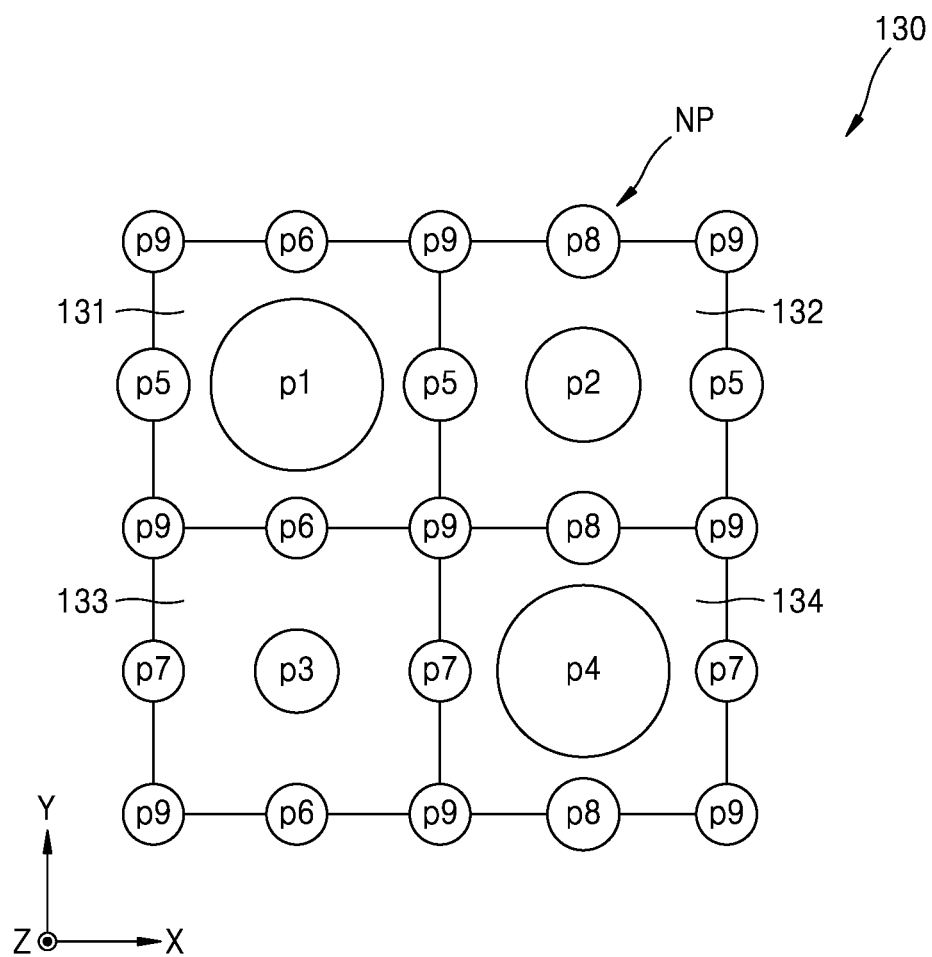
FIG. 5C is a plan view showing an enlarged view of a part in FIG. 5B.

FIGS. 4A and 4B are cross-sectional views of the pixel array 1100 in the image sensor 1000 according to an example embodiment; FIG. 5A is a plan view showing an arrangement of pixels in the pixel array 1100, FIG. 5B is a plan view showing an arrangement of nanoposts in a plurality of regions of the color separating lens array, and FIG. 5C is an enlarged plan view of a portion of FIG. 5B.

Referring to FIGS. 4A and 4B, the pixel array 1100 of the image sensor 1000 includes a sensor substrate 110 including a plurality of pixels 111, 112, 113, and 114 for sensing light, a spacer layer 120 that is transparent and disposed on the sensor substrate 110, and a color separating lens array 130 on the spacer layer 120. The sensor substrate 110 may include a first pixel 111, a second pixel 112, a third pixel 113, and a fourth pixel 114 that convert light into electrical signals. As shown in FIG. 4A, the first pixel 111 and the second pixel 112 may be alternately arranged in the first direction (X direction). In a cross-section in which Y direction location is different from FIG. 4A, the third pixel 113 and the fourth pixel 114 may be alternately arranged, as shown in FIG. 4B. According to an example embodiment, a pixel isolation layer for separating pixels may be further formed on a boundary between pixels.

FIG. 5A shows the arrangement of pixels when the pixel array 1100 of the image sensor 1000 has the Bayer pattern arrangement as shown in FIG. 2. The above arrangement is provided for separately sensing the incident light with unit patterns such as the Bayer pattern. For example, the first and fourth pixels 111 and 114 may be green pixels sensing green light, the second pixel 112 may be a blue pixel sensing blue light, and the third pixel 113 may be a red pixel sensing red light. Two green pixels, e.g., the first pixel 111 and the fourth pixel 114, are arranged in one diagonal direction, and the blue pixel and the red pixel, e.g., the second pixel 112 and the third pixel 113, may be arranged in another diagonal direction in a unit pattern of a 2×2 array.

The spacer layer 120 is disposed between the sensor substrate 110 and the color separating lens array 130 in order to maintain a distance between the sensor substrate 110 and the color separating lens array 130 constant. The spacer layer 120 may include a material transparent with respect to the visible ray, for example, a dielectric material having a lower refractive index than that of nanoposts NP of the color separating lens array 130 and low absorption coefficient in the visible ray band, e.g., $SiO_2$, siloxane-based spin on glass (SOG), etc. A thickness of the spacer layer 120 may be determined based on a focal distance of light condensed by the color separating lens array 130, for example, may be selected in a range from about 0.5 to about 1.5 times greater than the focal distance of the light of a reference wavelength ($\lambda_0$). A focal distance f of the reference wavelength light $\lambda_0$ condensed by the color separating lens array 130 may be expressed by equation 1 below, when a refractive index of the spacer layer 120 with respect to the reference wavelength $\lambda_0$ is n and a pitch between pixels is p.

$$f = \frac{np^2}{\lambda_0} - \frac{\lambda_0}{4n} \qquad \text{[Equation 1]}$$

Assuming that the reference wavelength $\lambda_0$ is 540 nm, e.g., green light, the pitch of the pixels 111, 112, 113, and 114 is 0.8 μm, and a refractive index n of the spacer layer 120 at the wavelength of 540 nm is 1.46, the focal distance f of the green light, that is, a distance between a lower surface of the color separating lens array 130 and a point where the green light is converged, is about 1.64 μm and a thickness 120h of the spacer layer 120 may be selected in a range from about 0.82 μm to about 2.46 μm.

The color separating lens array 130 may include the nanoposts NP of a high refractive index, which are supported by the spacer layer 120 and change a phase of the incident light, and a dielectric material layer DL formed of a dielectric material and arranged between the nanoposts NP and having a refractive index less than that of the nanoposts NP. The dielectric material of the dielectric material layer DL may include, for example, air or $SiO_2$.

Referring to FIG. 5B, the color separating lens array 130 may be partitioned into four pixel corresponding regions 131, 132, 133, and 134 corresponding to the pixels 111, 112, 113, and 114 of FIG. 5A. For example, a first pixel corresponding region 131 corresponds to the first pixel 111 and may be provided on the first pixel 111 in a vertical direction, a second pixel corresponding region 132 corresponds to the second pixel 112 and may be provided on the second pixel 112 in the vertical direction, a third pixel corresponding region 133 corresponds to the third pixel 113 and may be provided on the third pixel 113 in the vertical direction, and a fourth pixel corresponding region 134 corresponds to the fourth pixel 114 and may be provided on the fourth pixel 114 in the vertical direction. That is, the first to fourth pixel corresponding regions 131, 132, 133, and 134 of the color separating lens array 130 may be arranged to face the corresponding first to fourth pixels 111, 112, 113, and 114 of the sensor substrate 110 in the vertical direction.

The first to fourth pixel corresponding regions 131, 132, 133, and 134 may be two-dimensionally arranged in the first direction (X direction) and the second direction (Y direction), such that a first row in which the first pixel corresponding region 131 and the second pixel corresponding region 132 are alternately arranged and a second row in which the third pixel corresponding region 133 and the fourth pixel corresponding region 134 are alternately arranged are alternately repeated. Also, the first pixel corresponding region 131 and the fourth pixel corresponding region 134 may be adjacent to each other in a first diagonal direction, and the second pixel corresponding region 132 and the third pixel corresponding region 133 may be adjacent to each other in a second diagonal direction that intersects with the first diagonal direction. The color separating lens array 130 includes a plurality of unit patterns that are two-dimensionally arranged like the pixel array of the sensor substrate 110, and each of the unit patterns includes the first to fourth pixel corresponding regions 131, 132, 133, and 134 arranged in a 2×2 array.

In addition, similar to the above description with reference to FIGS. 3A and 3B, the color separating lens array 130 may be partitioned as a green light condensing region for condensing the green light, a blue light condensing region for condensing the blue light, and a red light condensing region for condensing the red light.

The color separating lens array 130 may include the nanoposts NP whose sizes, shapes, intervals, and/or arrangements are defined such that the green light is separately condensed to the first and fourth pixels 111 and 114, the blue light is separately condensed to the second pixel 112, and the red light is separately condensed to the third pixel 113. In addition, a thickness of the color separating lens array 130 in a third direction (Z direction) may be similar to heights of the nanoposts NP, and may be about 500 nm to about 1500 nm.

Referring to FIG. 5B, the first to fourth pixel corresponding regions 131, 132, 133, and 134 may include the nanoposts NP having cylindrical shapes each having a circular cross-section. In a center portion of each region, the nanoposts NP having different cross-sectional areas are disposed, and the nanoposts NP may be also disposed at the center on a boundary between pixels and a crossing point between the pixel boundaries.

FIG. 5C shows the arrangement of the nanoposts NP included in partial regions of FIG. 5B, that is, the pixel corresponding regions 131, 132, 133, and 134 in the unit pattern. In FIG. 5C, the nanoposts NP are indicated as p1 to p9 according to detailed locations thereof. Referring to FIG. 5C, from among the nanoposts NP, a nanopost p1 at the center of the first pixel corresponding region 131 and a nanopost p4 at the center of the fourth pixel corresponding region 134 have cross-sectional areas that are greater than those of a nanopost p2 at the center of the second pixel corresponding region 132 and a nanopost p3 at the center of the third pixel corresponding region 133, and the cross-sectional area of the nanopost p2 at the center of the second pixel corresponding region 132 is greater than that of the nanopost p3 at the center of the third pixel corresponding region 133. However, one or more example embodiments are not limited to the above example, and if necessary, the nanoposts NP having various shapes, sizes, and arrangement may be applied.

The nanoposts NP included in the first and fourth pixel corresponding regions 131 and 134 may have different distribution rules in the first direction (X direction) and the second direction (Y direction). For example, the nanoposts NP arranged in the first and fourth pixel corresponding regions 131 and 134 may have different size arrangement in the first direction (X direction) and the second direction (Y direction). As shown in FIG. 5C, from among the nanoposts NP, a cross-sectional area of a nanopost p5 located at a boundary between the first pixel corresponding region 131 and the second pixel corresponding region 132 that is adjacent to the first pixel corresponding region 131 in the first direction (X direction) is different from that of the nanoposts p6 located at a boundary between the first pixel corresponding region 131 and the third pixel corresponding region 133 that is adjacent to the first pixel corresponding region 131 in the second direction (Y direction). Likewise, a cross-sectional area of the nanopost p7 located at a boundary between the fourth pixel corresponding region 134 and the third pixel corresponding region 133 that is adjacent to the fourth pixel corresponding region 134 in the first direction (X direction) is different from that of the nanopost p8 located at a boundary between the fourth pixel corresponding region 134 and the second pixel corresponding region 132 that is adjacent to the fourth pixel corresponding region 134 in the second direction (Y direction).

On the other hand, the nanoposts NP arranged in the second pixel corresponding region 132 and the third pixel corresponding region 133 may have symmetrical arrangement rules along the first direction (X direction) and the second direction (Y direction). As shown in FIG. 5C, from among the nanoposts NP, the cross-sectional area of the nanoposts p5 at a boundary between adjacent pixels that are adjacent to the second pixel corresponding region 132 in the first direction (X direction) and the cross-sectional areas of the nanoposts p8 at a boundary between pixels adjacent to the second pixel corresponding region 132 in the second direction (Y direction) are the same as each other, and in the third pixel corresponding region 133, the cross-sectional areas of the nanoposts p7 at a boundary between adjacent pixels in the first direction (X direction) and the cross-sectional areas of the nanoposts p6 at a boundary between the adjacent pixels in the second direction (Y direction) are the same as each other. In addition, the nanoposts p9 at four corners in each of the first to fourth pixel corresponding regions 131, 132, 133, and 134, that is, points where the four regions cross one another, have the same cross-sectional areas as one another.

The above distribution is caused due to the pixel arrangement in the Bayer pattern. Pixels adjacent to the second pixel 112 and the third pixel 113 in the first direction (X direction) and the second direction (Y direction) are the same, e.g., the green pixels. However, a pixel adjacent to the first pixel 111 in the first direction (X direction) is a blue pixel and a pixel adjacent to the first pixel 111 in the second direction (Y direction) is a red pixel, and a pixel adjacent to the fourth pixel 114 in the first direction (X direction) is a red pixel and a pixel adjacent to the fourth pixel 114 in the second direction (Y direction) is a blue pixel. In addition, adjacent pixels to the first and fourth pixels 111 and 114 in four diagonal directions are green pixels, adjacent pixels to the second pixel 112 in the four diagonal directions are the red pixels, and adjacent pixels to the third pixel 113 in the four diagonal directions are the blue pixels. Therefore, in the second and third pixel corresponding regions 132 and 133, the nanoposts NP are arranged in a 4-fold symmetry, and in the first and fourth pixel corresponding regions 131 and 134, the nanoposts NP may be arranged in a 2-fold symmetry. In particular, the first pixel corresponding region 131 and the fourth pixel corresponding region 134 are rotated by 90° angle with respect to each other.

The plurality of nanoposts NP have symmetrical circular cross-sectional shapes in FIGS. 5B and 5C. However, some nanoposts having asymmetrical cross-sectional shapes may be included. For example, the first and fourth pixel corresponding regions 131 and 134 may adopt the nanoposts having asymmetrical cross-sections, each of which has different widths in the first direction (X direction) and the second direction (Y direction), and the second and third pixel corresponding regions 132 and 133 may adopt the nanoposts having symmetrical cross-sections, each of which has the same widths in the first direction (X direction) and the second direction (Y direction).

Referring back to FIGS. 4A and 4B, the color separating lens array 130 may further include a plurality of etch prevention patterns 140 arranged respectively under the nanoposts NP. Each of the etch prevention patterns 140 may be between a corresponding nanopost NP and the spacer layer 120 in order to protect damage to the spacer layer 120 during the process of forming the nanoposts NP. The etch prevention pattern 140 may include a dielectric material that has a relatively large etch selectivity with respect to the spacer layer 120 and is transparent. For example, the etch prevention pattern 140 may include at least one material selected from aluminum oxide (AlO), hafnium oxide (HfO), and silicon nitride (SiN). The etch prevention pattern 140 may have a thickness that is enough to perform the function of protecting the lower layer, e.g., the spacer layer 120, without degrading optical characteristics of the color separating lens array 130. The thickness of the etch prevention pattern 140 may be, for example, about 3 nm to about 50 nm, or about 5 nm to about 15 nm.

Also, in order to reduce an increase in a reflectivity due to the etch prevention pattern 140, the etch prevention pattern 140 may not completely cover the entire surface of the spacer layer 120. In other words, the etch prevention pattern 140 may be arranged to partially cover the upper surface of the spacer layer 120. For example, each etch prevention pattern 140 may be only arranged under the corresponding nanopost NP, and the etch prevention patterns 140 may be spaced apart from one another such that the upper surface of the spacer layer 120 may be in direct contact with the lower surface of the dielectric material layer DL between two adjacent etch prevention patterns 140. Because a refractive index of the spacer layer 120 and a refractive index of the dielectric material layer DL are nearly the same as each other, reflection may not occur at the interface between the spacer layer 120 and the dielectric material layer DL. Therefore, the increase in the reflectivity at the interface between the spacer layer 120 and the etch prevention pattern 140 may be minimized by minimizing the total area of the etch prevention patterns 140.

Figure 6A:
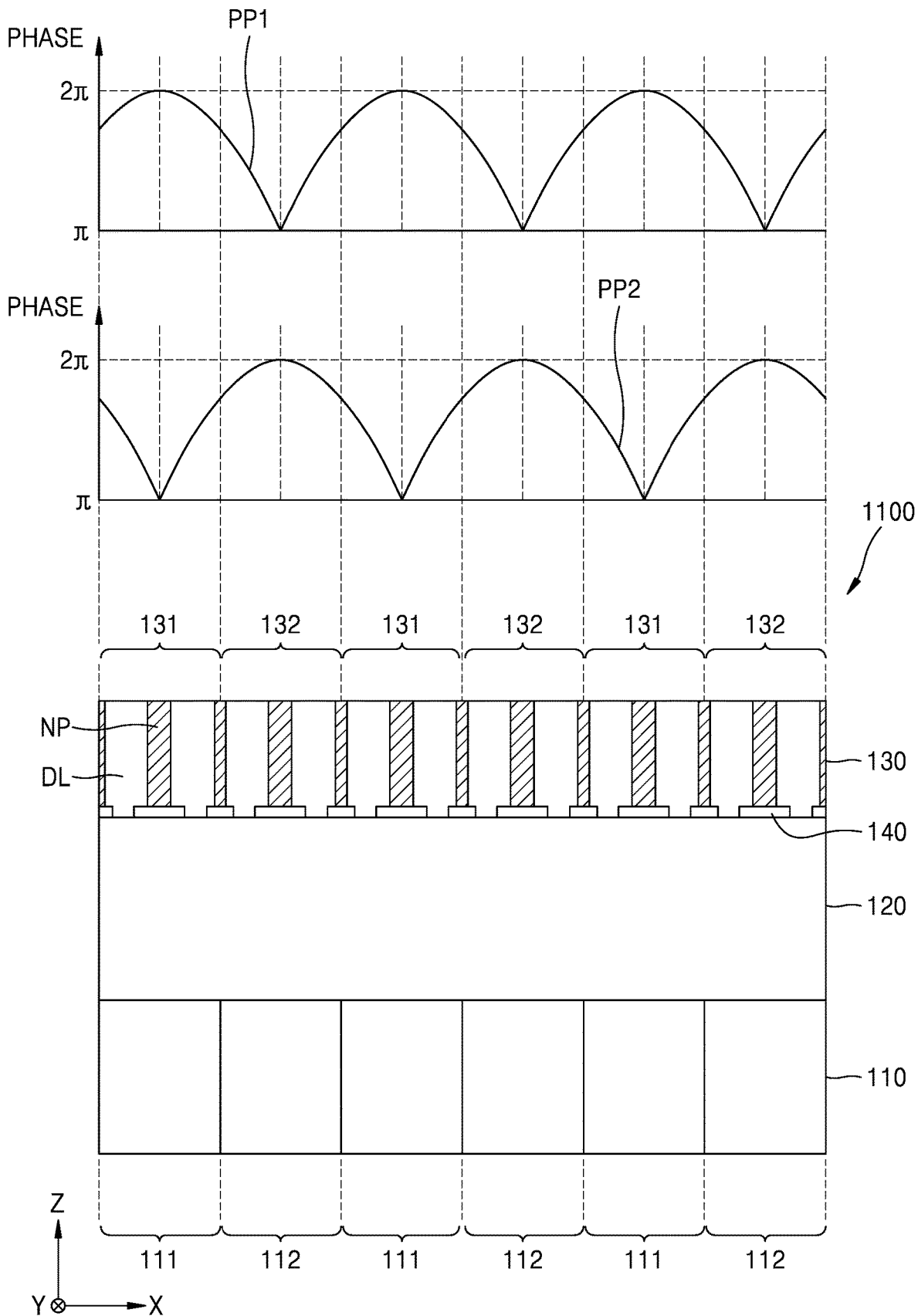
FIG. 6A is a diagram showing phase profiles of green light and blue light that have passed through a color separating lens array along line I-I' of FIG. 5B.
Figure 6B:
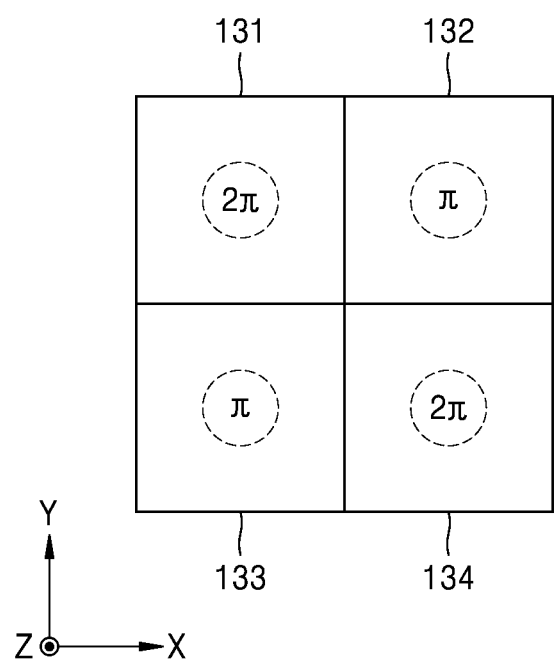
FIG. 6B is a diagram showing a phase of the green light that has passed through the color separating lens array at a center of pixel corresponding regions.
Figure 6C:
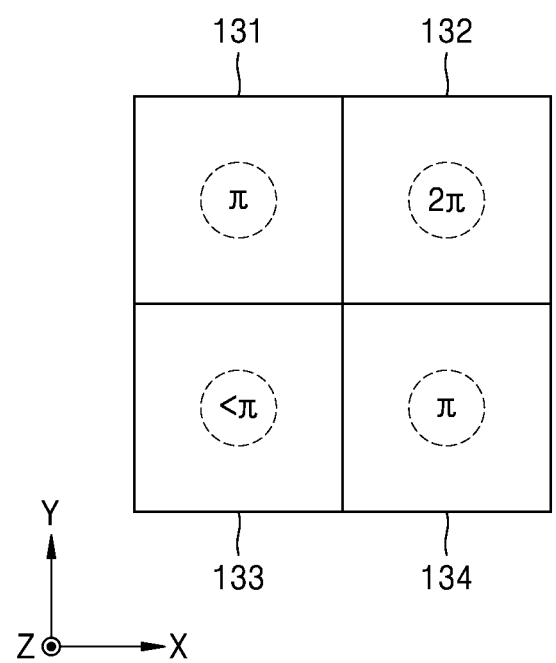
FIG. 6C is a diagram showing a phase of blue light that has passed through the color separating lens array at the center of pixel corresponding regions.

FIG. 6A shows phase profiles of the green light and the blue light that have passed through the color separating lens array 130 in line I-I' of FIG. 5B, FIG. 6B shows the phase of the green light that has passed through the color separating lens array 130 at centers of the pixel corresponding regions 131, 132, 133, and 134, and FIG. 6C shows the phase of the blue light that has passed through the color separating lens array 130 at the centers of the pixel corresponding regions 131, 132, 133, and 134. The phase profiles of the green light and the blue light shown in FIG. 6A are similar to those of the first and second wavelength light exemplary shown in FIG. 3B.

Referring to FIGS. 6A and 6B, the green light that has passed through the color separating lens array 130 may have a first phase profile PP1 that is the largest at the center of the first pixel corresponding region 131 and is reduced away from the center of the first pixel corresponding region 131. In detail, immediately after passing through the color separating lens array 130, that is, at a lower surface of the color separating lens array 130 or an upper surface of the spacer layer 120, the phase of the green light is the largest at the center of the first pixel corresponding region 131 and reduced as a concentric circle away from the center of the first pixel corresponding region 131. Thus, the phase is the smallest at the centers of the second and third pixel corresponding regions 132 and 133 in the X and Y directions, and at contact points between the first pixel corresponding region 131 and the fourth pixel corresponding region 134 in the diagonal direction.

When a phase of the green light is set as $2\pi$ based on the phase of light emitted from the center of the first pixel corresponding region 131, the light having a phase of about $0.9\pi$ to about $1.1\pi$ may be emitted from the centers of the second and third corresponding regions 132 and 133, and the green light having a phase of about $1.1\pi$ to about $1.5\pi$ may be emitted from a contact point between the first pixel corresponding region 131 and the fourth pixel corresponding region 134. Therefore, a difference between the phase of the green light that has passed through the center of the first pixel corresponding region 131 and the phase of the green light that has passed through the centers of the second and third pixel corresponding regions 132 and 133 may be about $0.9\pi$ to about $1.1\pi$.

In addition, the first phase profile PP1 does not denote that the phase delay amount of the light that has passed through the center of the first pixel corresponding region 131 is the largest, but when the phase of light that has passed through the first pixel corresponding region 131 is set to $2\pi$ and a phase delay amount of the light that has passed through another point is greater and has a phase value of $2\pi$ or greater, the first phase profile PP1 may denote a value remaining after subtracting $2n\pi$, that is, wrapped phase profile. For example, when the phase of light that has passed through the first pixel corresponding region 131 is set to $2\pi$ and the phase of light that has passed through the center of the second pixel corresponding region 132 is $3\pi$, the phase in the second pixel corresponding region 132 may be remaining $\pi$ after subtracting $\pi(n=1)$ from $3\pi$.

Referring to FIGS. 6A and 6C, the blue light that has passed through the color separating lens array 130 may have a second phase profile PP2 that is the largest at the center of the second pixel corresponding region 132 and is reduced away from the center of the second pixel corresponding region 132. In detail, immediately after passing through the color separating lens array 130, the phase of the blue light is the largest at the center of the second pixel corresponding region 132 and reduced as a concentric circle away from the center of the second pixel corresponding region 132, the phase is the smallest at the centers of the first and fourth pixel corresponding regions 131 and 134 in the X direction and the Y direction and the smallest at the center of the third pixel corresponding region 133 in the diagonal direction. When the phase of the blue light at the center of the second pixel corresponding region 132 is $2\pi$, the phase at the centers of the first and fourth pixel corresponding regions 131 and 134 may be about, for example, about $0.9\pi$ to about $1.1\pi$, and the phase at the center of the third pixel corresponding region 133 may be less than that at the centers of the first and fourth pixel corresponding regions 131 and 134, for example, about $0.5\pi$ to about $0.9\pi$.

Figure 6D:
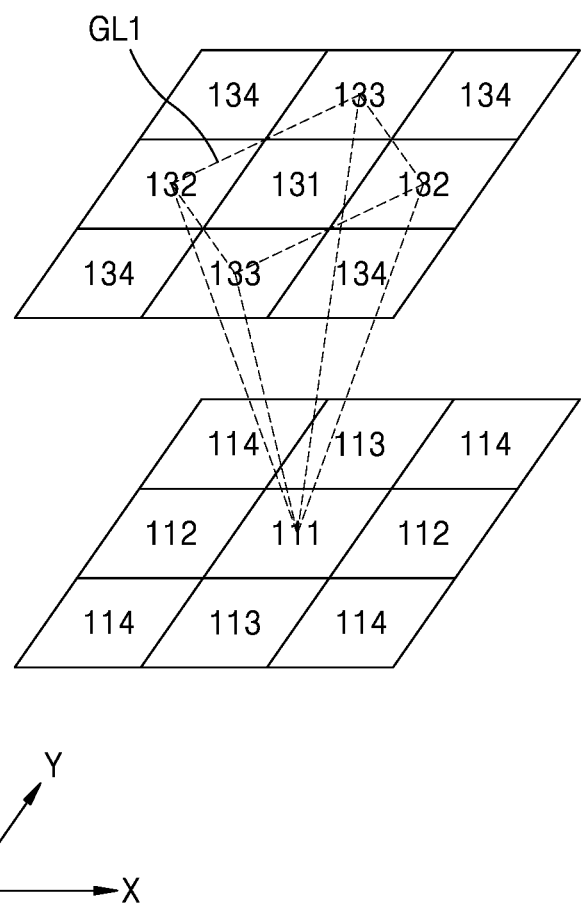
FIG. 6D is a diagram showing an example of a traveling direction of green light incident on a first green light condensing region.
Figure 6E:
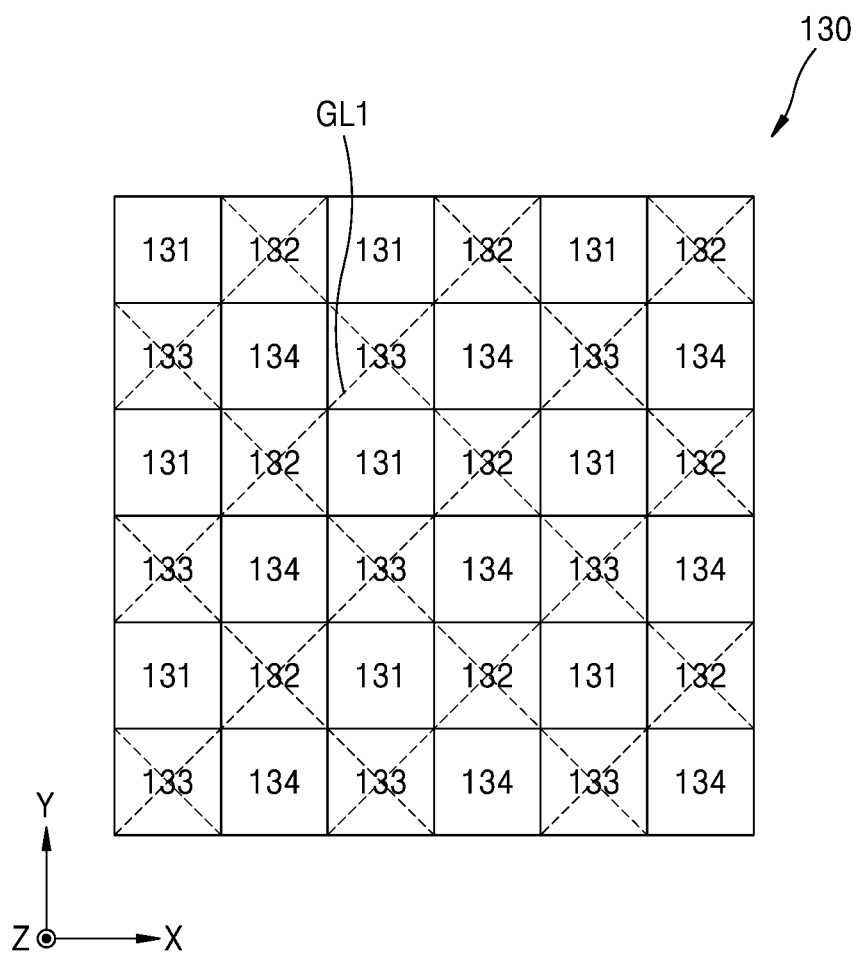
FIG. 6E is a diagram showing an example of an array of the first green light condensing region.

FIG. 6D shows an example of a traveling direction of green light incident on a first light condensing region, and FIG. 6E shows an example of an array of the first light condensing region.

As shown in FIG. 6D, the green light incident on the vicinity of the first pixel corresponding region 131 is condensed to the first pixel 111 by the color separating lens array 130, and the green light from the second and third pixel corresponding regions 132 and 133, in addition to the first pixel corresponding region 131, is also incident on the first pixel 111. That is, according to the phase profile of the green light described above with reference to FIGS. 6A and 6B, the green light that has passed through a first green light condensing region GL1 that is obtained by connecting centers of two second pixel corresponding regions 132 and two third pixel corresponding regions 133 that are adjacent to the first pixel corresponding region 131 is condensed onto the first pixel 111. Therefore, as shown in FIG. 6E, the color separating lens array 130 may operate as a first green light condensing region GL1 array for condensing the green light onto the first pixel 111. The first green light condensing region GL1 may have a greater area than that of the corresponding first pixel 111, e.g., may be 1.2 times to two times greater than that of the first pixel 111.

Figure 6F:
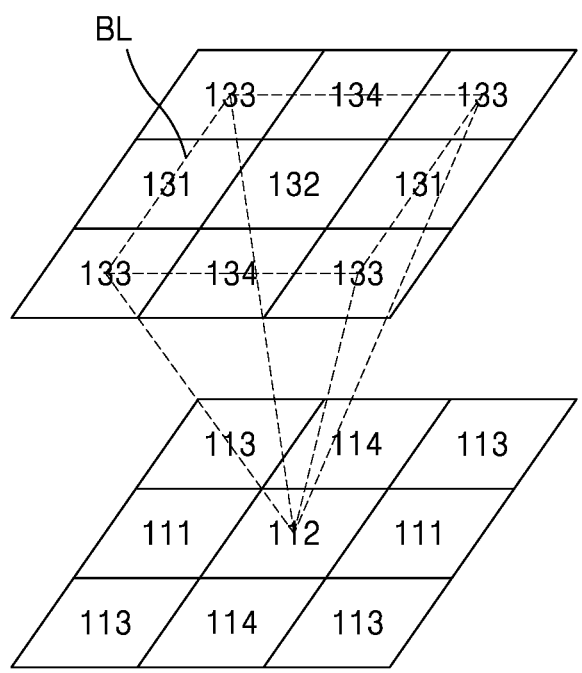
FIG. 6F is a diagram showing an example of a traveling direction of blue light incident on a blue light condensing region.
Figure 6G:
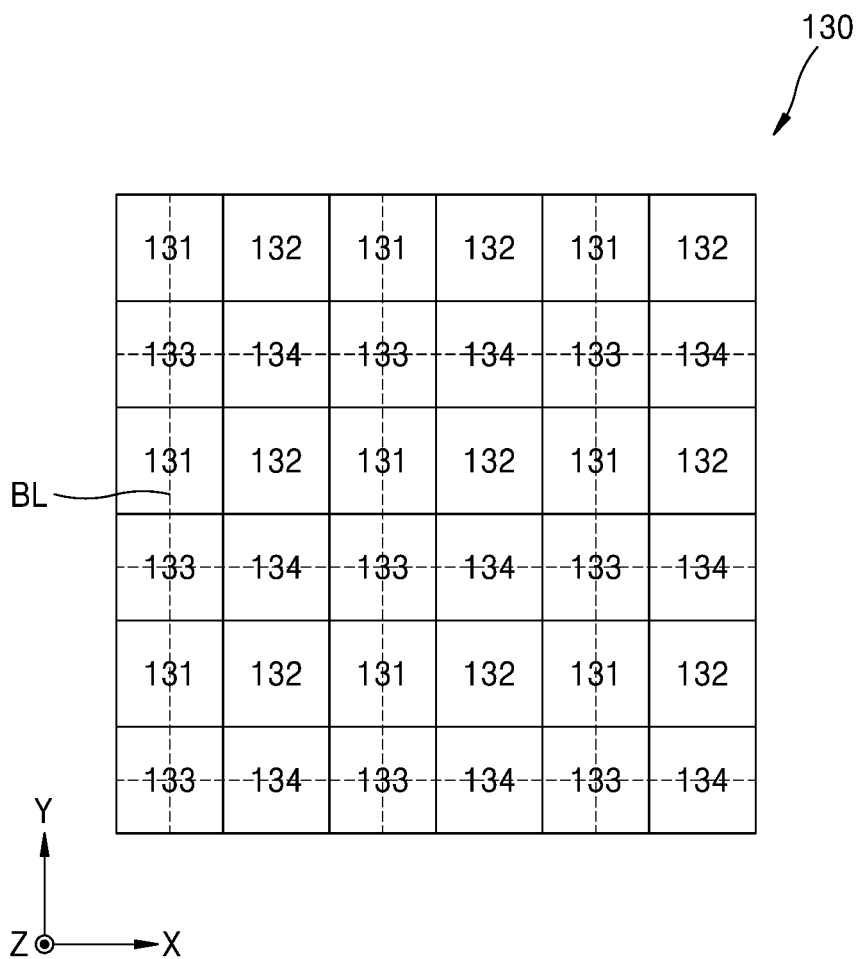
FIG. 6G is a diagram showing an example of an array of the blue light condensing region.

FIG. 6F shows an example of a traveling direction of blue light incident on a first blue light condensing region, and FIG. 6G shows an example of an array of the blue light condensing region.

The blue light is condensed onto the second pixel 112 by the color separating lens array 130 as shown in FIG. 6F, and the blue light from the pixel corresponding regions 131, 132, 133, and 134 is incident on the second pixel 112. In the phase profile of the blue light described above with reference to FIGS. 6A and 6C, the blue light that has passed through a blue light condensing region BL that is obtained by connecting centers of four third pixel corresponding regions 133 adjacent to the second pixel corresponding region 132 at apexes is condensed onto the second pixel 112. Therefore, as shown in FIG. 6G, the color separating lens array 130 may operate as a blue light condensing region array for condensing the blue light to the second pixel 112. The blue light condensing region BL has an area greater than that of the second pixel 112, e.g., may be 1.5 to 4 times greater. The blue light condensing region BL may partially overlap the first green light condensing region GL1 described above, and a second green light condensing region GL2 and a red light condensing region RL.

Figure 7A:
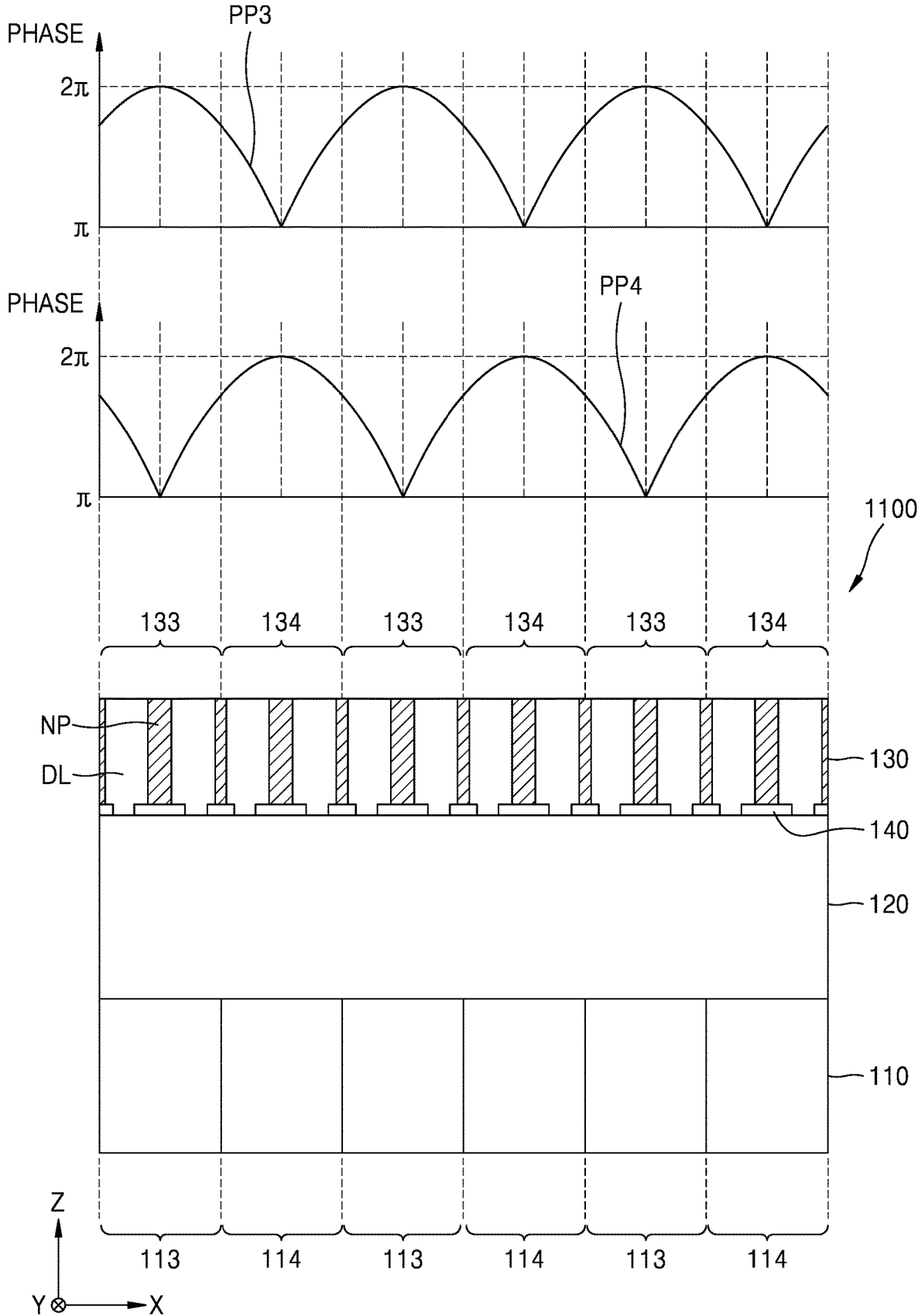
FIG. 7A is a diagram showing phase profiles of red light and green light that have passed through a color separating lens array along line II-II' of FIG. 5B.
Figure 7B:
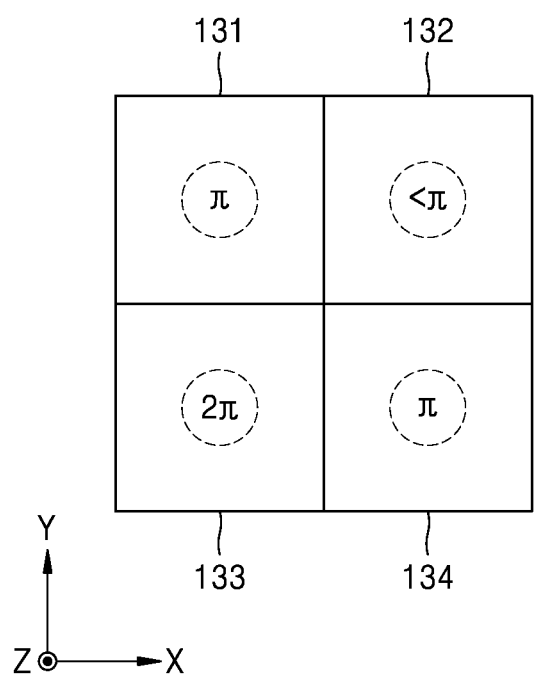
FIG. 7B is a diagram showing a phase of the red light that has passed through the color separating lens array at a center of pixel corresponding regions.
Figure 7C:
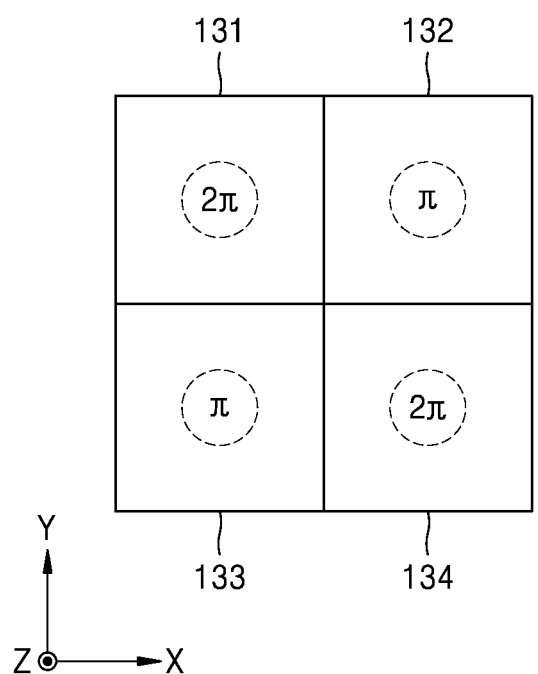
FIG. 7C is a diagram showing a phase of green light that has passed through the color separating lens array at the center of pixel corresponding regions.

FIG. 7A shows phase profiles of the green light and the red light that have passed through the color separating lens array 130 in line II-II' of FIG. 5B, FIG. 7B shows the phase of the red light that has passed through the color separating lens array 130 at centers of the pixel corresponding regions 131, 132, 133, and 134, and FIG. 7C shows the phase of the green light that has passed through the color separating lens array 130 at the centers of the pixel corresponding regions 131, 132, 133, and 134.

Referring to FIGS. 7A and 7B, the red light that has passed through the color separating lens array 130 may have a third phase profile PP3 that is the largest at the center of the third pixel corresponding region 133 and is reduced away from the center of the third pixel corresponding region 133. In detail, immediately after passing through the color separating lens array 130, the phase of the red light is the largest at the center of the third pixel corresponding region 133 and reduced as a concentric circle away from the center of the third pixel corresponding region 133, the phase is the smallest at the centers of the first and fourth pixel corresponding regions 131 and 134 in the X direction and the Y direction and the smallest at the center of the second pixel corresponding region 132 in the diagonal direction. When the phase of the red light at the center of the third pixel corresponding region 133 is $2\pi$, the phase at the centers of the first and fourth pixel corresponding regions 131 and 134 may be about, for example, about $0.9\pi$ to about $1.1\pi$, and the phase at the center of the second pixel corresponding region 132 may be less than that at the centers of the first and fourth pixel corresponding regions 131 and 134, for example, about $0.5\pi$ to about $0.9\pi$.

Referring to FIGS. 7A and 7C, the green light that has passed through the color separating lens array 130 may have a fourth phase profile PP4 that is the largest at the center of the fourth pixel corresponding region 134 and is reduced away from the center of the fourth pixel corresponding region 134. When the first phase profile PP1 of FIG. 6A is compared with the fourth phase profile PP4 of FIG. 7A, the fourth phase profile PP4 may be obtained by moving the first phase profile PP1 in parallel in X and Y directions as much as a first pixel pitch. That is, the first phase profile PP1 has the largest phase at the center of the first pixel corresponding region 131, but the fourth phase profile PP4 has the largest phase at the center of the fourth pixel corresponding region 134 that is apart by one-pixel pitch from the center of the first pixel corresponding region 131 in the X-direction and the Y-direction. The phase profiles in FIGS. 6B and 7C showing the phases at the centers of the pixel corresponding regions 131, 132, 133, and 134 may be the same as each other. Regarding the phase profile of the green light based on the fourth pixel corresponding region 134, when the phase of the green light emitted from the center of the fourth pixel corresponding region 134 is set as $2\pi$, the light having the phase of about $0.9\pi$ to about $1.1\pi$ may be emitted from the centers of the second and third pixel corresponding regions 132 and 133 and the light having the phase of about $1.1\pi$ to about $1.5\pi$ may be emitted from the contact point between the first pixel corresponding region 131 and the fourth pixel corresponding region 134.

Figure 7D:
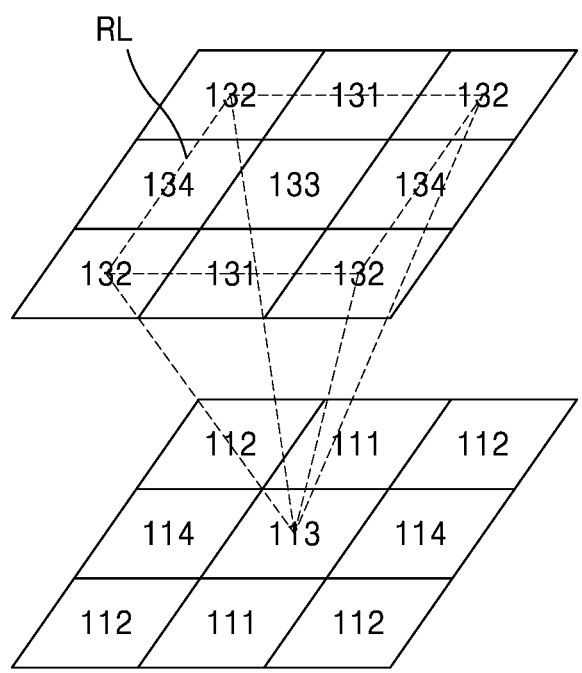
FIG. 7D is a diagram showing an example of a proceeding direction of red light incident on a red light condensing region.
Figure 7E:
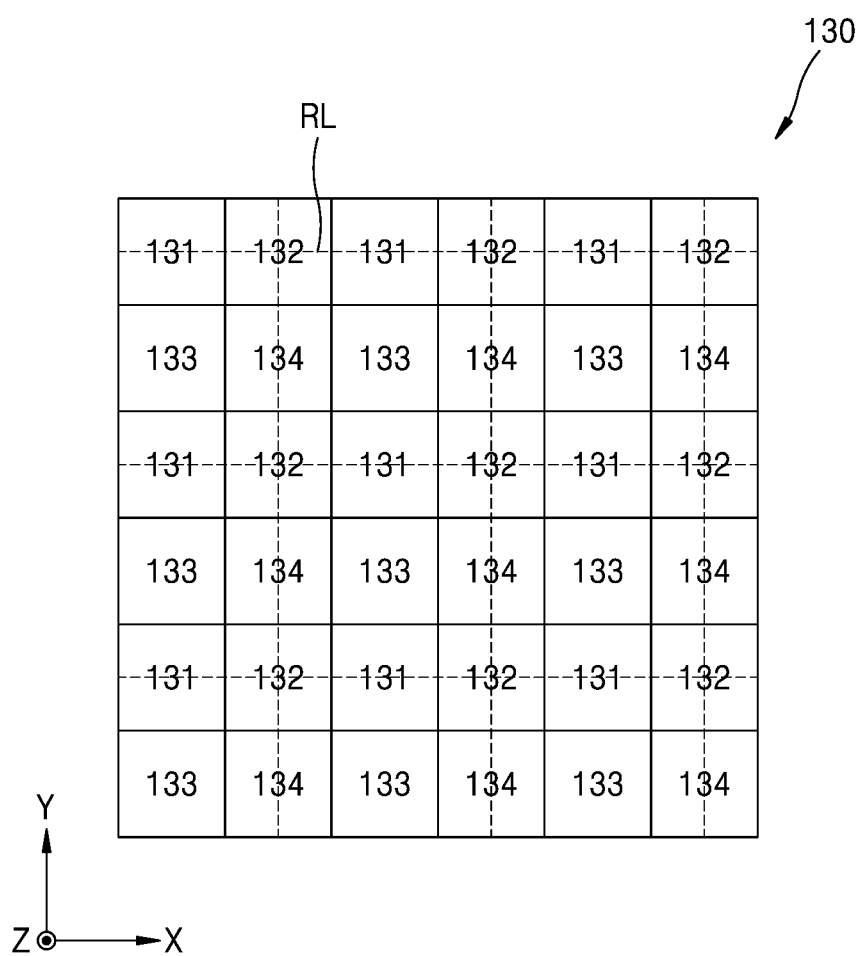
FIG. 7E is a diagram showing an example of an array of the red light condensing region.

FIG. 7D shows an example of a proceeding direction of red light incident on a red light condensing region, and FIG. 7E shows an example of an array of the red light condensing region.

The red light is condensed onto the third pixel 113 by the color separating lens array 130 as shown in FIG. 7D, and the red light from the pixel corresponding regions 131, 132, 133, and 134 is incident on the third pixel 113. In the phase profile of the red light described above with reference to FIGS. 7A and 7B, the red light that has passed through a red light condensing region RL that is obtained by connecting centers of four second pixel corresponding regions 132 adjacent to the third pixel corresponding region 133 at apexes is condensed onto the third pixel 113. Therefore, as shown in FIG. 7E, the color separating lens array 130 may operate as a red light condensing region array for condensing the red light to the third pixel 113. The red light condensing region RL has an area greater than that of the third pixel 113, e.g., may be 1.5 to 4 times greater. The red light condensing region RL may partially overlap the first and second green light condensing regions GL1 and GL2 and the blue light condensing region BL.

Figure 7F:
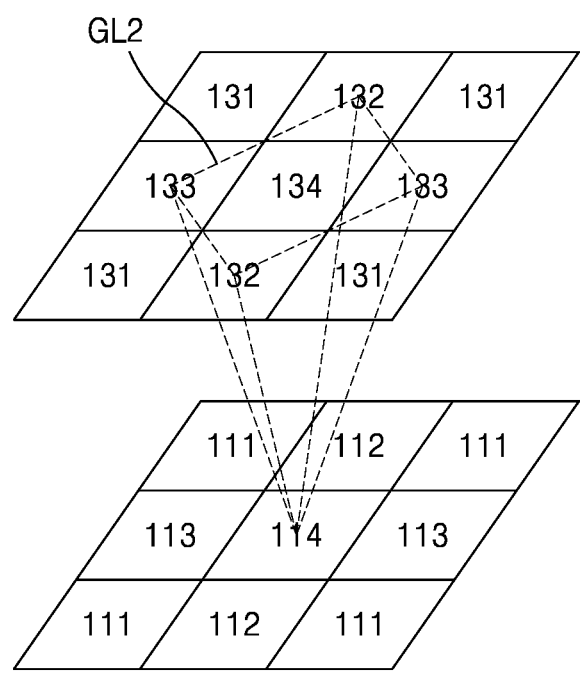
FIG. 7F is a diagram showing an example of a proceeding direction of green light incident on a second green light condensing region.
Figure 7G:
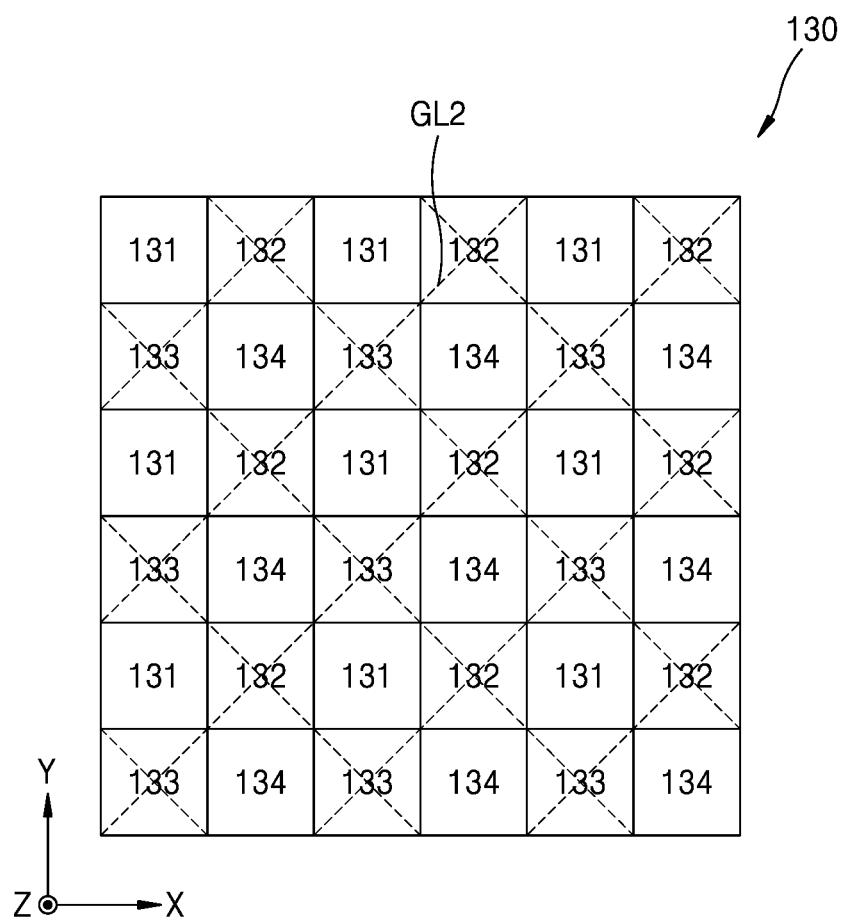
FIG. 7G is a diagram showing an example of an array of the second green light condensing region.

Referring to FIGS. 7F and 7G, the green light incident on the vicinity of the fourth pixel corresponding region 134 proceeds similarly to the green light incident on the vicinity of the first pixel corresponding region 131, and as shown in FIG. 7F, the green light is condensed onto the fourth pixel 114. Therefore, as shown in FIG. 7G, the color separating lens array 130 may operate as a second green light condensing region array for condensing the green light onto the fourth pixel 114. The second green light condensing region GL2 may have a greater area than that of the corresponding fourth pixel 114, e.g., may be 1.2 times to twice greater.

The color separating lens array 130 satisfying the above phase profile and performance described above may be automatically designed through various types of computer simulations. For example, the structures of the pixel corresponding regions 131, 132, 133, and 134 may be optimized through a nature-inspired algorithm such as a genetic algorithm, a particle swarm optimization algorithm, an ant colony optimization algorithm, etc., or a reverse design based on an adjoint optimization algorithm.

The structures of the green, blue, and red pixel corresponding regions may be optimized while evaluating performances of a plurality of candidate color separating lens arrays based on evaluation factors such as color separation spectrum, optical efficiency, signal-to-noise ratio, etc. when designing the color separating lens array 130. For example, the structures of the green, blue, and red pixel corresponding regions may be optimized in a manner that a target numerical value of each evaluation factor is determined in advance and the sum of the differences from the target numerical values of a plurality of evaluation factors is reduced. Alternatively, the performance may be indexed for each evaluation factor, and the structures of the green, blue, and red pixel corresponding regions may be optimized so that a value representing the performance may be maximized.

FIGS. 8A to 8E are cross-sectional views illustrating a method of manufacturing the color separating lens array 130, according to an example embodiment.

Figure 8A:
FIGS. 8A to 8E are cross-sectional views schematically illustrating a method of manufacturing the color separating lens array, according to an example embodiment.

Referring to FIG. 8A, an etch prevention pattern material layer 140' may be formed on the upper surface of the spacer layer 120. The etch prevention pattern material layer 140' may be formed on the entire area of the upper surface of the spacer layer 120. For example, aluminum oxide (AlO), hafnium oxide (HfO), silicon nitride (SiN), etc. may be deposited by a chemical vapor deposition (CVD), a physical vapor deposition (PVD), a plasma enhanced CVD (PECVD), an atomic layer deposition (ALD) method, etc. to form the etch prevention pattern material layer 140'.

Figure 8B:
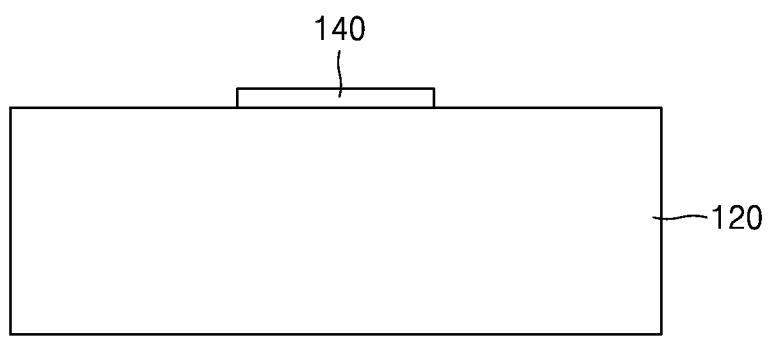

Referring to FIG. 8B, the etch prevention pattern 140 may be formed by patterning the etch prevention pattern material layer 140' shown in FIG. 8A. According to an example embodiment, the etch prevention pattern material layer 140' may be patterned using a photolithography method to form the etch prevention pattern 140. FIG. 8B shows only one etch prevention pattern 140 for convenience of description, but a plurality of etch prevention patterns 140 may be formed on the spacer layer 120. The position of the patterned etch prevention pattern 140 corresponds to a position where the nanopost NP is formed by etching the dielectric material layer DL in a subsequent process.

Figure 8C:
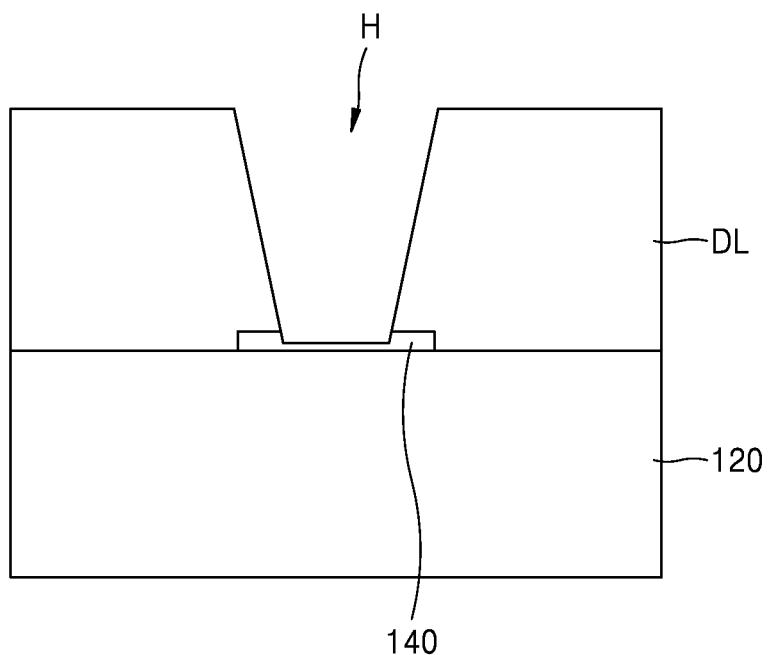

Referring to FIG. 8C, the dielectric material layer DL may be formed to cover the spacer layer 120 and the patterned etch prevention pattern 140. In addition, the dielectric material layer DL may be partially etched to form a hole H in which the nanopost NP is to be formed. The dielectric material layer DL may be etched until the etch prevention pattern 140 is exposed. The etch prevention pattern 140 may prevent the damage to the spacer layer 120 due to an etchant during the etching process of the dielectric material layer DL. For instance, according to an example embodiment, the after the dielectric material layer DL is partially etched to form the hole H, at least some portion of the etch prevention pattern 140 may remain between the hole H and the spacer 120, such that the hole H does not expose the spacer 120.

Figure 8D:
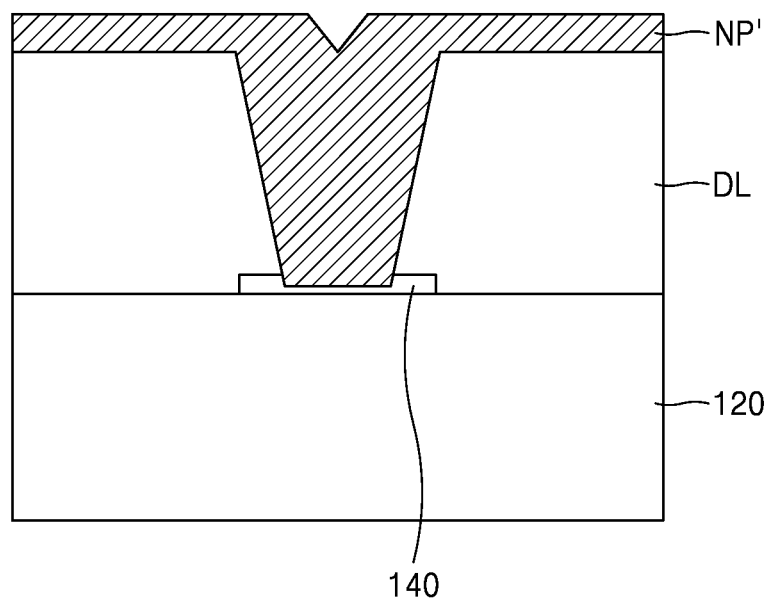

Referring to FIG. 8D, a nanopost material layer NP' may be deposited on the dielectric material layer DL. For example, c-Si, p-Si, a-Si and a Group III-V compound semiconductor (GaP, GaN, GaAs etc.), SiC, $TiO_2$, SiN, etc. may be deposited on the entire area of the upper surface of the dielectric material layer DL. Here, the nanopost material layer NP' may be filled in the hole H in the dielectric material layer DL.

Figure 8E:
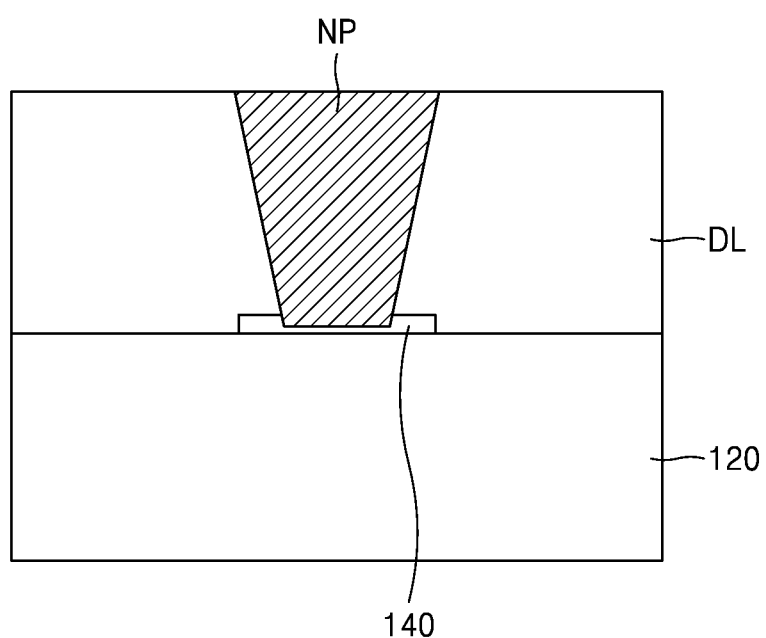

Referring to FIG. 8E, the nanopost material layer NP' shown in FIG. 8D on the upper surface of the dielectric material layer DL may be removed. According to an example embodiment, the nanopost material layer NP' shown in FIG. 8D may be removed by a chemical mechanical polishing (CMP) method. Then, the nanopost NP may be formed in the hole H of the dielectric material layer DL. The nanoposts NP formed as above may have uniform widths or diameters in the height direction as shown in FIGS. 4A and 4B, or may have increasing widths or diameters in the height direction as shown in FIG. 8E.

Figure 9:
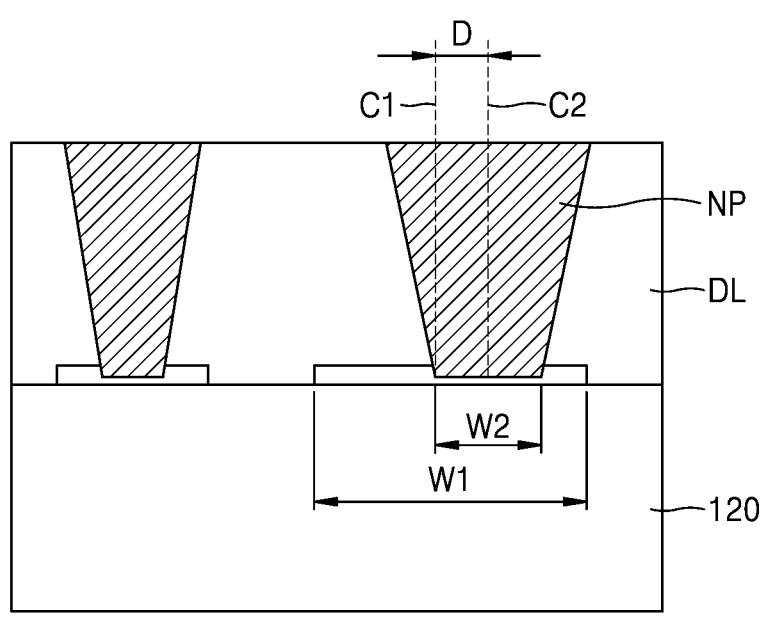
FIG. 9 is a schematic cross-sectional view for illustrating a minimum size of the etch prevention pattern.

A size of the etch prevention pattern 140 may be selected taking into account the alignment error of a mask in the photolithography process such that an etching position of the dielectric material layer DL, that is, the position of the hole H, may not deviate from the etch prevention pattern 140. For example, an area of the etch prevention pattern 140 may be selected to be greater than a lower area of the hole H by at least the alignment error of the mask. FIG. 9 is a cross-sectional view for illustrating a minimum size of the etch prevention pattern 140.

Referring to FIG. 9, a center C1 of the etch prevention pattern 140 and a center C2 of the nanopost NP corresponding to the etch prevention pattern 140 may not match due to the alignment error of the mask during the photolithography process. In order to address the alignment error, according to an example embodiment, a width or a diameter W1 of the etch prevention pattern 140 may be greater than a width or a diameter W2 of a lower portion in a corresponding nanopost NP by a maximum distance D between the center C1 of the etch prevention pattern 140 and the center C2 of the corresponding nanopost NP or greater. In other words, the width or the diameter W1 of the etch prevention pattern 140 may be expressed as $W1 \geq W2+\max(D)$. Here, $\max(D)$ may be determined according to an allowable tolerance of photolithography equipment. For example, $\max(D)$ may be about 50 nm or less. Also, the width or the diameter W2 of the lower portion of the nanopost NP may be about 50 nm to about 400 nm. Therefore, the width or the diameter W1 of the etch prevention pattern 140 may be, for example, about 100 nm to about 450 nm or greater. In addition, when the size of the etch prevention pattern 140 excessively increases, there is a loss caused by reflection. Thus, a maximum value of the width or the diameter W1 of the etch prevention pattern 140 may be about 1.1 times greater than $W2+\max(D)$. For example, the width or the diameter W1 of the etch prevention pattern 140 may be about 100 nm to about 500 nm. In addition, a ratio of the width or the diameter W1 of the etch prevention pattern 140 with respect to the width or the diameter W2 of the lower portion of the nanopost NP may be about 1.2 to two times.

Figure 10:
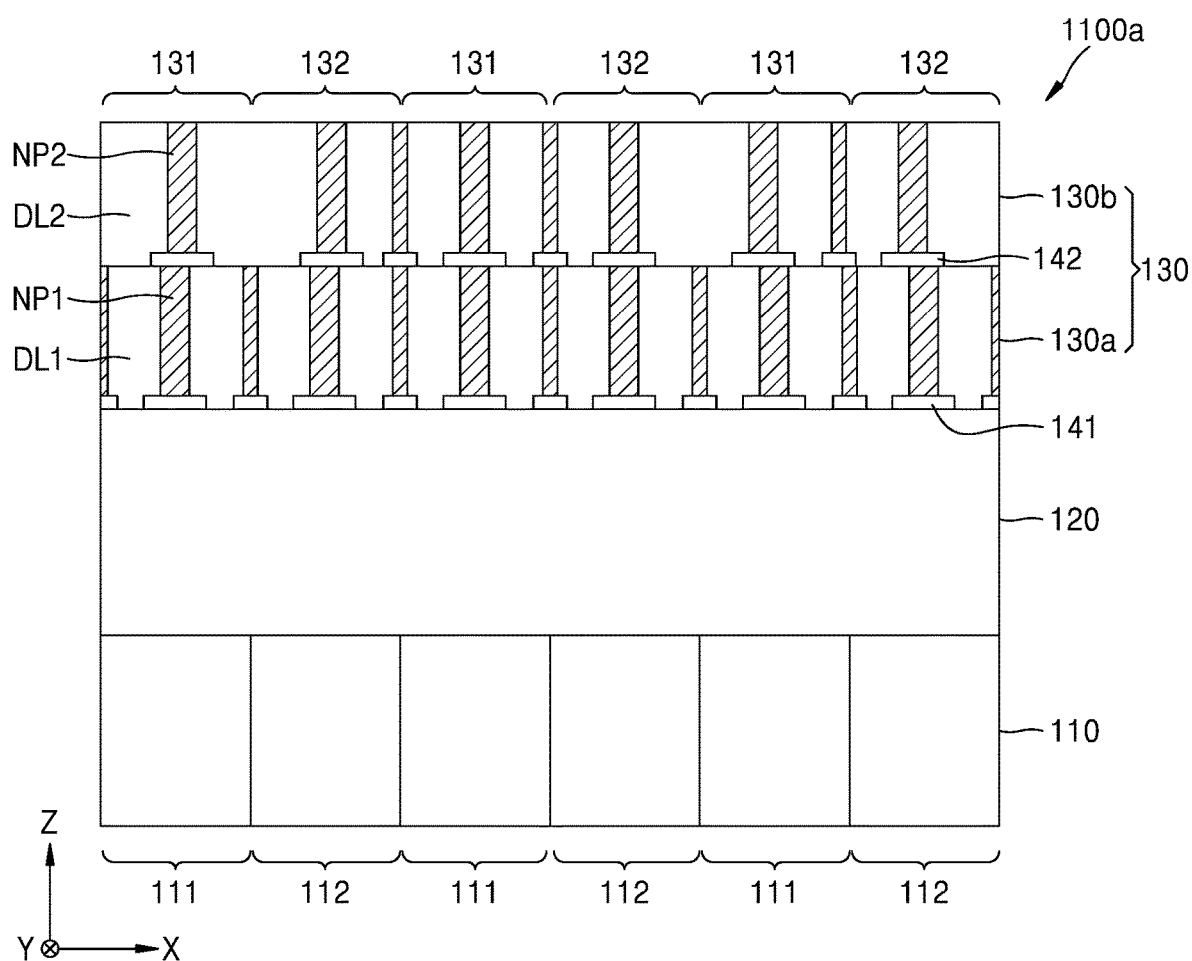
FIG. 10 is a schematic cross-sectional view of a pixel array in an image sensor according to an example embodiment.

FIG. 10 is a cross-sectional view of a pixel array in the image sensor 1000, according to an example embodiment. Referring to FIG. 10, a pixel array 1100a may include the color separating lens array 130 having a dual-layered structure. For example, the color separating lens array 130 may include a first color separating lens array layer 130a and a second color separating lens array layer 130b on the first color separating lens array layer 130a. The first color separating lens array layer 130a may include first nanoposts NP1 and a first dielectric material layer DL1 among the first nanoposts NP1. Also, the second color separating lens array layer 130b may include second nanoposts NP2 and a second dielectric material layer DL2 among the second nanoposts NP2.

Arrangement of the first nanoposts NP1 in the first color separating lens array layer 130a and arrangement of the second nanoposts NP2 in the second color separating lens array layer 130b may be different from each other. For example, because an incident angle of a chief ray incident on the color separating lens array 130 varies depending on the position of the color separating lens array 130, the second nanoposts NP2 may be shifted toward the center of the color separating lens array 130 with respect to the corresponding first nanoposts NP1 located thereunder. Also, the second nanoposts NP2 may not be arranged on some of the first nanoposts NP1. In other words, the nanoposts may be omitted from and the second dielectric material layer DL2 may be filled in some region of the second color separating lens array layer 130b.

Also, the color separating lens array 130 may further include first etch prevention patterns 141 arranged respectively under the first nanoposts NP1, and second etch prevention patterns 142 arranged respectively under the second nanoposts NP2. The first etch prevention pattern 141 is arranged on the upper surface of the spacer layer 120 and may protect the spacer layer 120 when forming the first color separating lens array layer 130a. The second etch prevention pattern 142 may be arranged on the upper surface of the first color separating lens array layer 130a and may protect the first color separating lens array layer 130a when forming the second color separating lens array layer 130b.

The second color separating lens array 130b may be formed in the method described above with reference to FIGS. 8A to 8E. For example, a second etch prevention pattern material is deposited and patterned on the upper surface of the first color separating lens array layer 130a to form the second etch prevention pattern 142, the second dielectric material layer DL2 is deposited and holes are patterned, and then, the second nanoposts NP2 may be filled in the holes of the second dielectric material layer DL2. The location of the second etch prevention pattern 142 is the same as a location where the second dielectric material layer DL2 is etched, that is, a location where the second nanopost NP2 is formed. A size of the second etch prevention pattern 142 may be greater than that of the second nanopost NP2, in consideration of the alignment error of the mask.

Also, the second etch prevention pattern 142 may be arranged on various locations according to a necessity during the process. FIGS. 11A to 11D are cross-sectional views showing examples of various arrangements of the second etch prevention pattern 142 in the pixel array 1100a of FIG. 10.

Figure 11A:
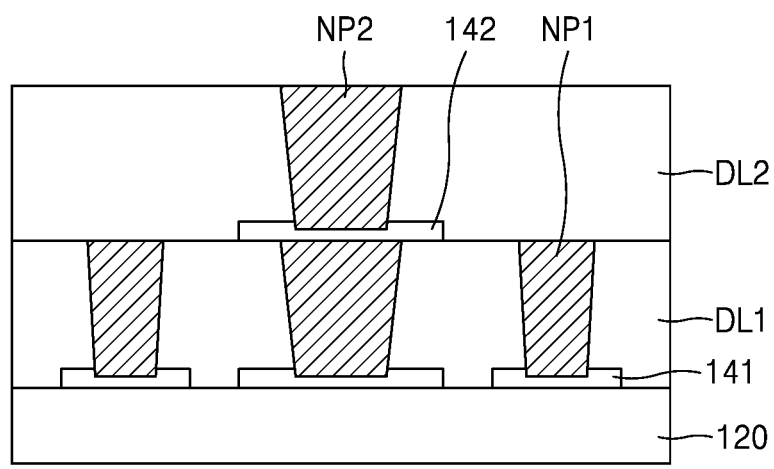
FIGS. 11A to 11D are cross-sectional views showing examples of various arrangements of the second etch prevention pattern in the pixel array of FIG. 10.

Referring to FIG. 11A, the second etch prevention pattern 142 may be only arranged on a location where the etching is performed when forming the second color separating lens array layer 130b. In other words, the second etch prevention pattern 142 may be only arranged under the second nanopost NP2. That is, from among the plurality of first nanoposts NP1, the etch prevention pattern 142 is not located on the first nanopost NP1, on which the second nanopost NP2 is not arranged, and the upper surface of the first nanopost NP1 is in direct contact with the second dielectric material layer DL2. A width or a diameter of each second etch prevention pattern 142 may be about 1.2 to about 2 times greater than a width or a diameter of the second nanopost NP2 located thereon.

Figure 11B:
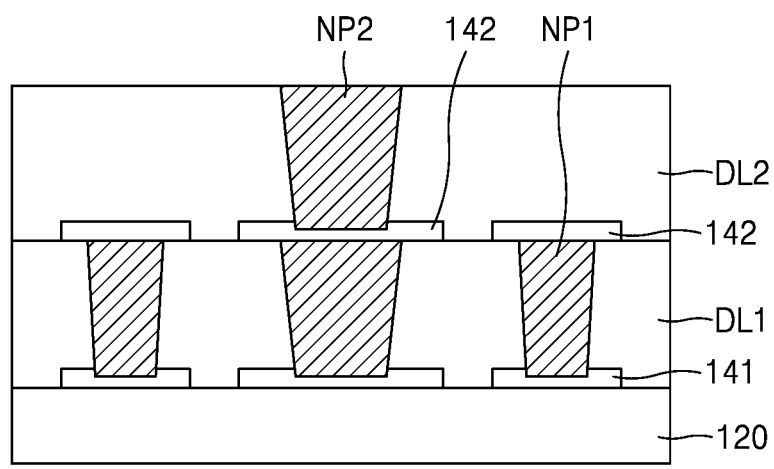

Referring to FIG. 11B, when the first nanoposts NP1 of the first color separating lens array layer 130a are also etched during the etching process for patterning the second etch prevention patterns 142, the second etch prevention patterns 142 may be arranged on the regions where the second nanoposts NP2 are not provided, in order to protect the first nanoposts NP1. For example, the second etch prevention pattern 142 may be respectively arranged under the second nanopost NP2 and on the upper surface of the first nanopost NP1. From among the second etch prevention patterns 142 arranged on the upper surface of the first nanoposts NP1, the second nanoposts NP2 may not be arranged on some second etch prevention patterns 142. From among the plurality of second etch prevention patterns 142, the width or diameter of the second etch prevention pattern 142 on which the second nanopost NP2 is not arranged may be about 1.2 to two times greater than the width or diameter of the upper portion of the first nanopost NP1 arranged thereunder, taking into account the alignment error of the mask.

Figure 11C:
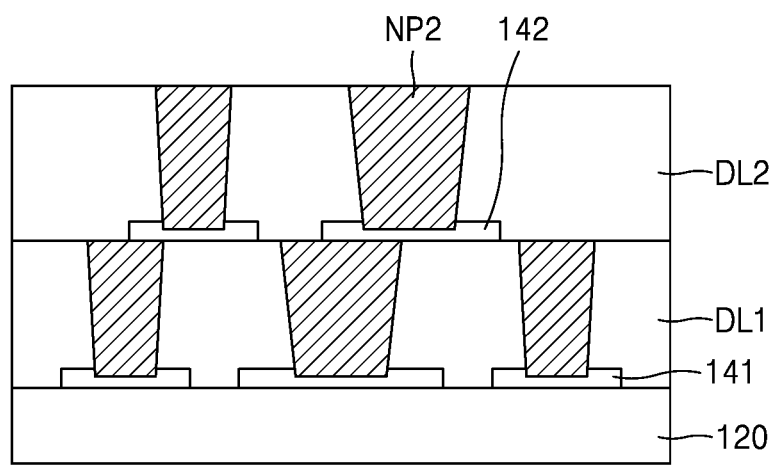

Referring to FIG. 11C, some of the second nanoposts NP2 may be shifted in the lateral direction with respect to the first nanoposts NP1 corresponding thereto, for example, in the direction toward the center of the color separating lens array 130. When the first nanoposts NP1 of the first color separating lens array layer 130a is not etched in the etching process for patterning the second etch prevention patterns 142, the location and size of the second etch prevention pattern 142 may be determined only according to the location and size of the second nanopost NP2 arranged thereon. For example, the second etch prevention pattern 142 may be shifted in the lateral direction with respect to the first nanopost NP1 that corresponds to the second nanopost NP2 arranged on the second etch prevention pattern 142. In this case, the second etch prevention pattern 142 may partially cover the upper surface of the first nanopost NP1 arranged thereunder.

Figure 11D:
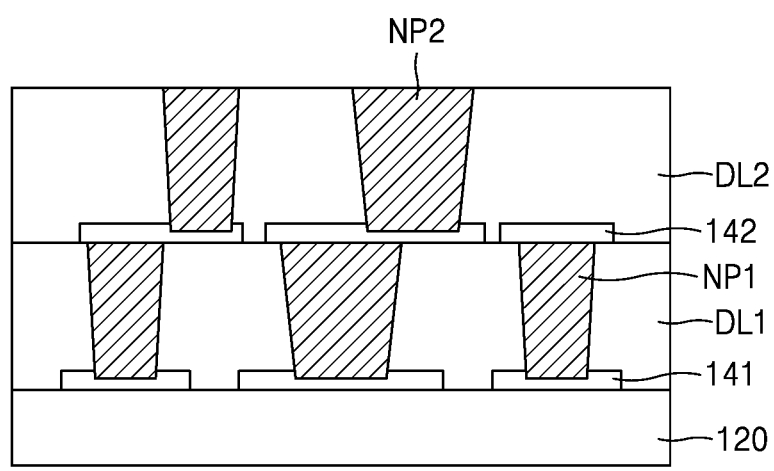

Referring to FIG. 11D, when the first nanoposts NP1 of the first color separating lens array layer 130a are also etched during the etching process for patterning the second etch prevention pattern 142, the second etch prevention pattern 142 may be arranged to completely cover the upper surface of the first nanopost NP1. For example, the second etch prevention pattern 142 may completely cover the upper surface of the first nanopost NP1 corresponding to the second nanopost NP2 formed thereon. In this case, the width or diameter of each second etch prevention pattern 142 may be two or more times greater than the width or diameter of the second nanopost NP2 arranged thereon. Also, the second etch prevention patterns 142 may be further arranged to cover the first nanoposts NP1 even on the region where the second nanoposts NP2 are not provided.

Figure 12:
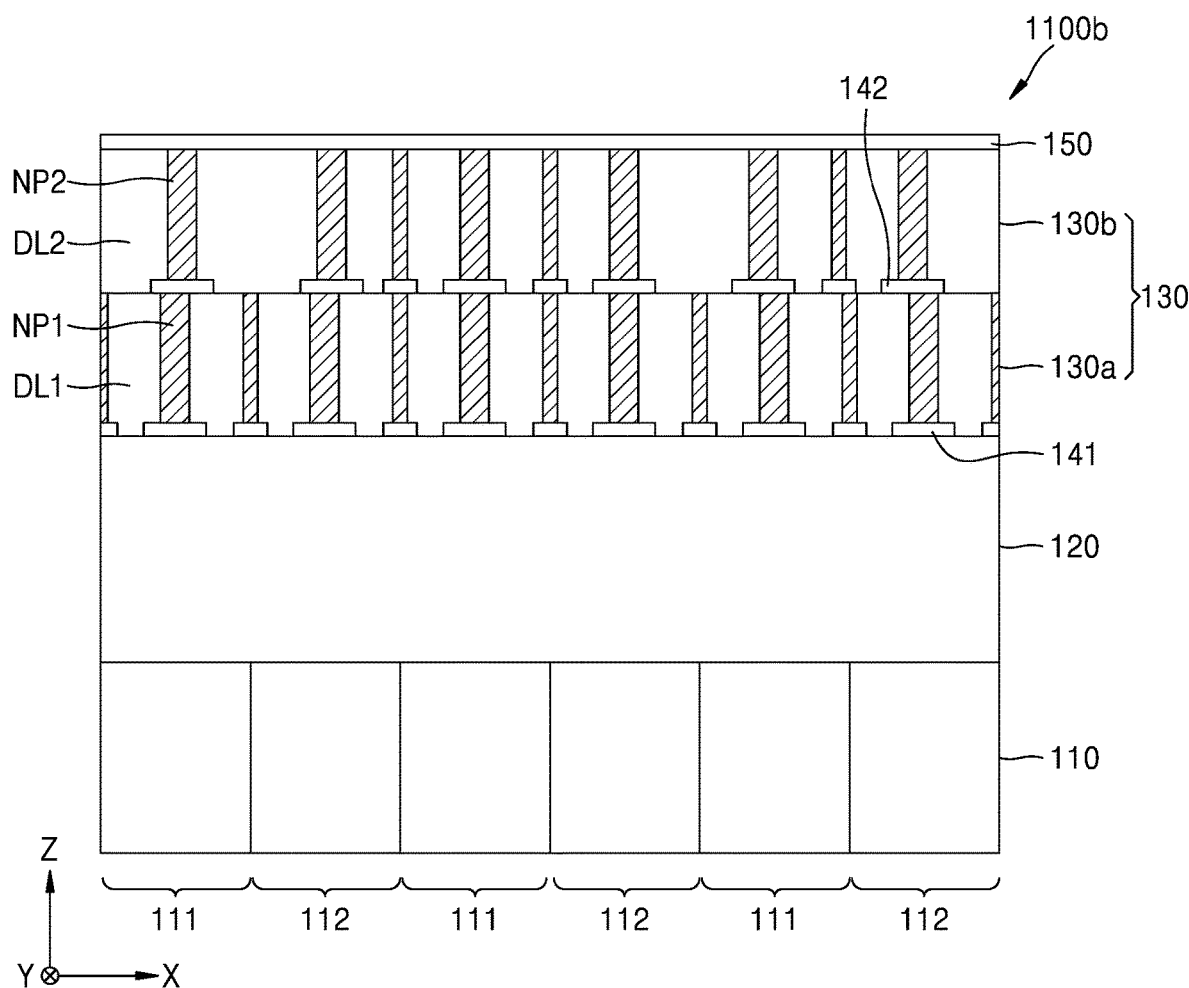
FIG. 12 is a schematic cross-sectional view of a pixel array in an image sensor according to another example embodiment.

FIG. 12 is a cross-sectional view of a pixel array 1100b in the image sensor 1000, according to an example embodiment. Referring to FIG. 12, the pixel array 1100b may further include an anti-reflection layer 150 on the upper surface of the color separating lens array 130. The anti-reflection layer 150 may improve a light utilization efficiency of the pixel array 1100b by reducing the light, from the incident light, reflected by the upper surface of the color separating lens array 130. In other words, the anti-reflection layer 150 allows the light incident from outside on the pixel array 1100b not to be reflected from the upper surface of the color separating lens array 130, but to pass through the color separating lens array 130 and be sensed by the sensor substrate 110. The anti-reflection layer 150 may have a single layer including a material having a refractive index different from that of the material in the first and second nanoposts NP1 and NP2, for example, $SiO_2$. The anti-reflection layer 150 may have a thickness of about 80 nm to about 120 nm.

Figure 13:
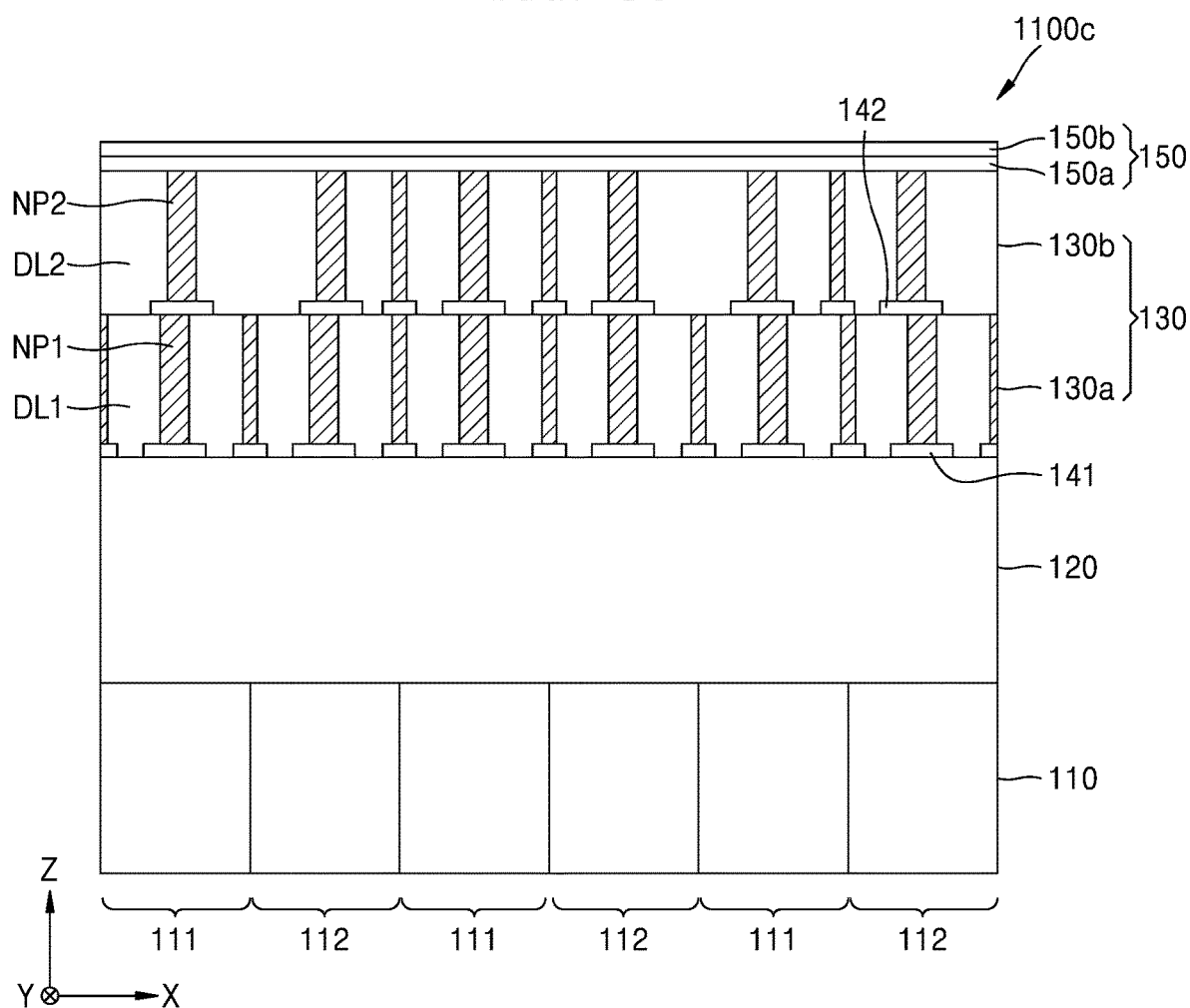
FIG. 13 is a schematic cross-sectional view of a pixel array in an image sensor according to another example embodiment.

FIG. 13 is a cross-sectional view of a pixel array 1100c in the image sensor 1000, according to an example embodiment. Referring to FIG. 13, the pixel array 1100c may include the anti-reflection layer 150 having a multi-layered structure in which a plurality of layers are stacked. For example, the anti-reflection layer 150 may include a first anti-reflection layer 150a on the color separating lens array 130 and a second anti-reflection layer 150b on the first anti-reflection layer 150a. The first anti-reflection layer 150a and the second anti-reflection layer 150b may include different dielectric materials from each other. The first anti-reflection layer 150a may include, for example, a $Si_3N_4$ layer, and may have a thickness of about 20 nm to about 60 nm. The second anti-reflection layer 150b may include, for example, a $SiO_2$ layer, and may have a thickness of about 80 nm to about 120 nm. In FIG. 13, the anti-reflection layer 150 only includes two layers, but may include three or more layers as necessary.

Figure 14:
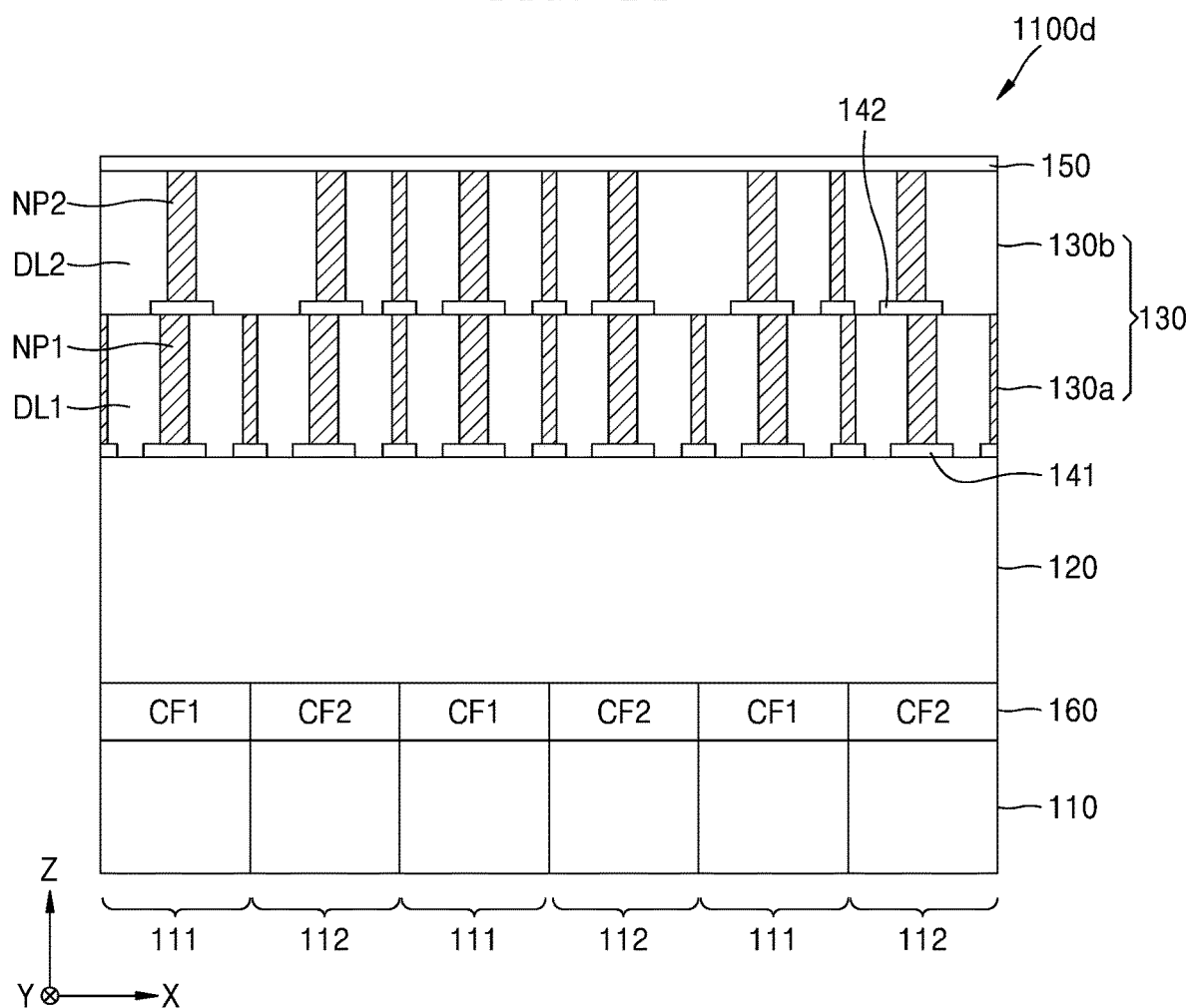
FIG. 14 is a schematic cross-sectional view of a pixel array in an image sensor according to another example embodiment.

FIG. 14 is a cross-sectional view of a pixel array 1100 in the image sensor 1000, according to an example embodiment. Referring to FIG. 14, the pixel array 1100 of the image sensor 1000 may further include a color filter array 160 between the sensor substrate 110 and the spacer layer 120. The color filter array 160 is arranged on the sensor substrate 110, and the spacer layer 120 may be on the color filter array 160. The color filter array 160 may include first color filters CF1 on the first pixels 111 and second color filters CF2 on the second pixels 112. According to an example embodiment, the color filter array 160 may include third color filters on the third pixels 113 and fourth color filters on the fourth pixels 114. For example, the first color filter CF1 and the fourth color filter may be green color filters only transmitting the green light, the second color filter CF2 may be a blue color filter only transmitting the blue light, and the third color filter may be a red color filter only transmitting the red light. Because the light that has been substantially color-separated by the color separating lens array 130 proceeds toward the first to fourth pixels 111, 112, 113, and 114, there may be a little light loss even when the color filter array 160 is used. When the color filter array 160 is used, a color purity of the image sensor 1000 may be further improved. However, the color filter array 160 is not an essential element, and may be omitted provided that a color separating efficiency of the color separating lens array 130 is sufficiently high.

According to the image sensor 1000 including the pixel arrays described above, light loss due to a color filter, e.g., an organic color filter, rarely occurs, and thus, a sufficient amount of light may be provided to the pixels even when the pixels become smaller. Therefore, an ultra-high resolution, ultra-small, and highly sensitive image sensor having hundreds of millions of pixels or more may be manufactured. Such an ultra-high resolution, ultra-small, and highly sensitive image sensor may be employed in various high-performance optical devices or high-performance electronic apparatuses. The electronic apparatuses may include, for example, smartphones, mobile phones, cell phones, personal digital assistants (PDAs), laptop computers, personal computers (PCs), a variety of portable devices, electronic apparatuses, surveillance cameras, medical camera, automobiles, Internet of Things (IoT) devices, other mobile or non-mobile computing devices and are not limited thereto.

The electronic apparatuses may further include, in addition to the image sensor 1000, a processor for controlling the image sensor, for example, an application processor (AP), and may control a plurality of hardware or software elements and may perform various data processes and operations by driving an operation system or application programs via the processor. The processor may further include a graphic processing unit (GPU) and/or an image signal processor. When an image signal processor is included in the processor, an image (or video) obtained by the image sensor may be stored and/or output by using the processor.

Figure 15:
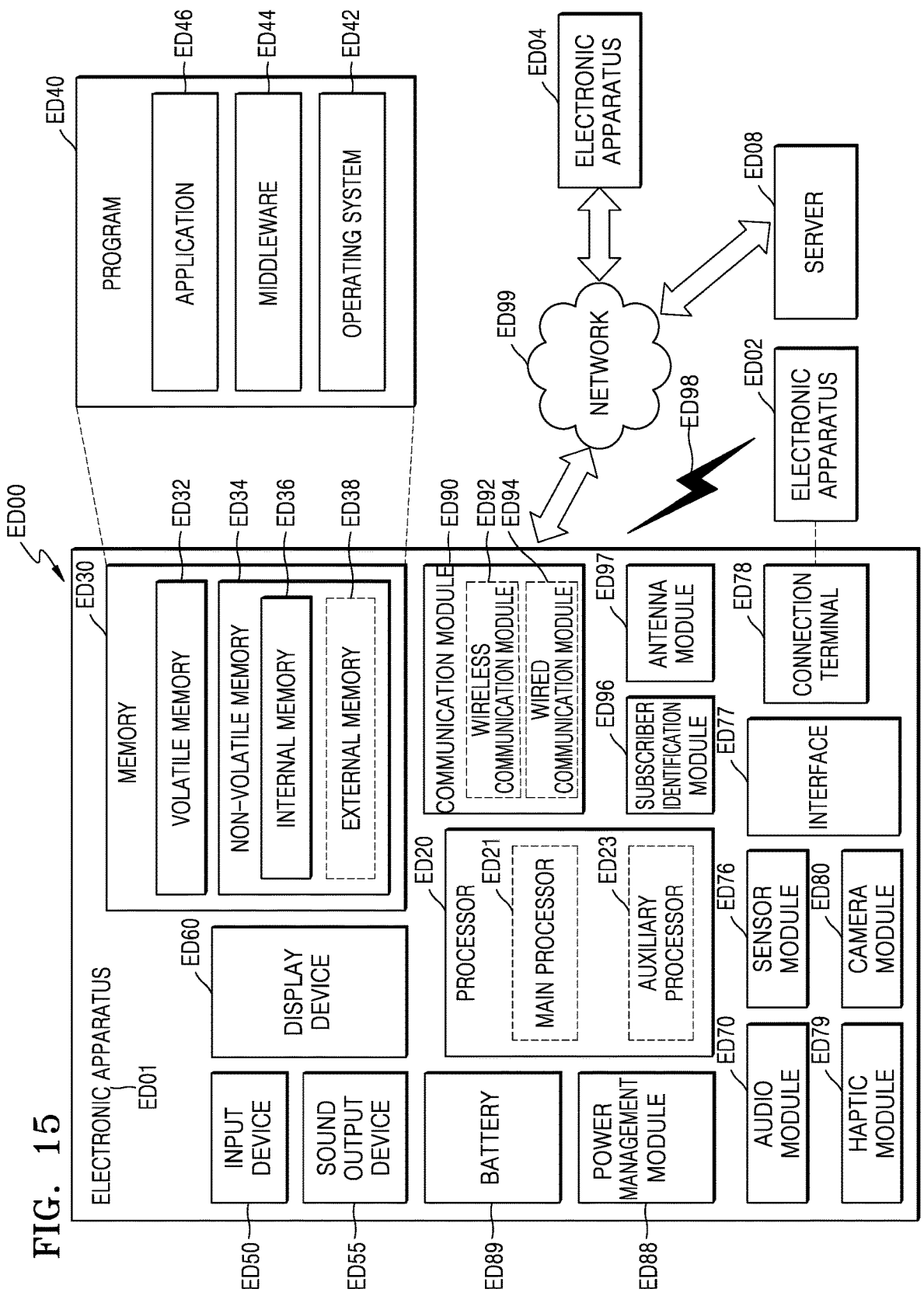
FIG. 15 is a block diagram of an electronic apparatus including an image sensor according to one or more example embodiments.

FIG. 15 is a block diagram showing an example of an electronic apparatus ED01 including the image sensor 1000. Referring to FIG. 15, in a network environment ED00, the electronic apparatus ED01 may communicate with another electronic apparatus ED02 via a first network ED98 (short-range wireless communication network, etc.), or may communicate with another electronic apparatus ED04 and/or a server ED08 via a second network ED99 (long-range wireless communication network, etc.) The electronic apparatus ED01 may communicate with the electronic apparatus ED04 via the server ED08. The electronic apparatus ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic apparatus ED01, some (display device ED60, etc.) of the elements may be omitted or another element may be added. Some of the elements may be configured as one integrated circuit. For example, the sensor module ED76 (a fingerprint sensor, an iris sensor, an illuminance sensor, etc.) may be embedded and implemented in the display device ED60 (display, etc.)

The processor ED20 may control one or more elements (hardware, software elements, etc.) of the electronic apparatus ED01 connected to the processor ED20 by executing software (program ED40, etc.), and may perform various data processes or operations. As a part of the data processing or operations, the processor ED20 may load a command and/or data received from another element (sensor module ED76, communication module ED90, etc.) to a volatile memory ED32, may process the command and/or data stored in the volatile memory ED32, and may store result data in a non-volatile memory ED34. The processor ED20 may include a main processor ED21 (central processing unit, application processor, etc.) and an auxiliary processor ED23 (graphic processing unit, image signal processor, sensor hub processor, communication processor, etc.) that may be operated independently from or along with the main processor ED21. The auxiliary processor ED23 may use less power than that of the main processor ED21, and may perform specified functions.

The auxiliary processor ED23, on behalf of the main processor ED21 while the main processor ED21 is in an inactive state (sleep state) or along with the main processor ED21 while the main processor ED21 is in an active state (application executed state), may control functions and/or states related to some (display device ED60, sensor module ED76, communication module ED90, etc.) of the elements in the electronic apparatus ED01. The auxiliary processor ED23 (image signal processor, communication processor, etc.) may be implemented as a part of another element (camera module ED80, communication module ED90, etc.) that is functionally related thereto.

The memory ED30 may store various data required by the elements (processor ED20, sensor module ED76, etc.) of the electronic apparatus ED01. The data may include, for example, input data and/or output data about software (program ED40, etc.) and commands related thereto. The memory ED30 may include the volatile memory ED32 and/or the non-volatile memory ED34. The non-volatile memory ED34 may include an internal memory ED36 fixedly installed in the electronic apparatus ED01, and an external memory ED38 that is detachable.

The program ED40 may be stored as software in the memory ED30, and may include an operation system ED42, middle ware ED44, and/or an application ED46.

The input device ED50 may receive commands and/or data to be used in the elements (processor ED20, etc.) of the electronic apparatus ED01, from outside (user, etc.) of the electronic apparatus ED01. The input device ED50 may include a microphone, a mouse, a keyboard, and/or a digital pen (stylus pen).

The sound output device ED55 may output a sound signal to outside of the electronic apparatus ED01. The sound output device ED55 may include a speaker and/or a receiver. The speaker may be used for a general purpose such as multimedia reproduction or record play, and the receiver may be used to receive a call. The receiver may be coupled as a part of the speaker or may be implemented as an independent device.

The display device ED60 may provide visual information to outside of the electronic apparatus ED01. The display device ED60 may include a display, a hologram device, or a projector, and a control circuit for controlling the corresponding device. The display device ED60 may include a touch circuitry set to sense a touch, and/or a sensor circuit (pressure sensor, etc.) that is set to measure a strength of a force generated by the touch.

The audio module ED70 may convert sound into an electrical signal or vice versa. The audio module ED 70 may acquire sound through the input device ED50, or may output sound via the sound output device ED55 and/or a speaker and/or a headphone of another electronic apparatus (electronic apparatus ED02, etc.) connected directly or wirelessly to the electronic apparatus ED01.

The sensor module ED76 may sense an operating state (power, temperature, etc.) of the electronic apparatus ED01, or an outer environmental state (user state, etc.), and may generate an electrical signal and/or data value corresponding to the sensed state. The sensor module ED76 may include a gesture sensor, a gyro-sensor, a pressure sensor, a magnetic sensor, an acceleration sensor, a grip sensor, a proximity sensor, a color sensor, an infrared (IR) ray sensor, a vivo sensor, a temperature sensor, a humidity sensor, and/or an illuminance sensor.

The interface ED77 may support one or more designated protocols that may be used in order for the electronic apparatus ED01 to be directly or wirelessly connected to another electronic apparatus (electronic apparatus ED02, etc.) The interface ED77 may include a high-definition multimedia interface (HDMI), a universal serial bus (USB) interface, an SD card interface, and/or an audio interface.

The connection terminal ED78 may include a connector by which the electronic apparatus ED01 may be physically connected to another electronic apparatus (electronic apparatus ED02, etc.). The connection terminal ED78 may include an HDMI connector, a USB connector, an SD card connector, and/or an audio connector (headphone connector, etc.).

The haptic module ED79 may convert the electrical signal into a mechanical stimulation (vibration, motion, etc.) or an electric stimulation that the user may sense through a tactile or motion sensation. The haptic module ED79 may include a motor, a piezoelectric device, and/or an electric stimulus device.

The camera module ED80 may capture a still image and a video. The camera module ED80 may include a lens assembly including one or more lenses, the image sensor 1000 of FIG. 1, image signal processors, and/or flashes. The lens assembly included in the camera module ED80 may collect light emitted from an object that is an object to be captured.

The power management module ED88 may manage the power supplied to the electronic apparatus ED01. The power management module ED88 may be implemented as a part of a power management integrated circuit (PMIC).

The battery ED89 may supply electric power to components of the electronic apparatus ED01. The battery ED89 may include a primary battery that is not rechargeable, a secondary battery that is rechargeable, and/or a fuel cell.

The communication module ED90 may support the establishment of a direct (wired) communication channel and/or a wireless communication channel between the electronic apparatus ED01 and another electronic apparatus (electronic apparatus ED02, electronic apparatus ED04, server ED08, etc.), and execution of communication through the established communication channel. The communication module ED90 may be operated independently from the processor ED20 (application processor, etc.), and may include one or more communication processors that support the direct communication and/or the wireless communication. The communication module ED90 may include a wireless communication module ED92 (cellular communication module, a short-range wireless communication module, a global navigation satellite system (GNSS) communication module) and/or a wired communication module ED94 (local area network (LAN) communication module, a power line communication module, etc.). From among the communication modules, a corresponding communication module may communicate with another electronic apparatus via a first network ED09 (short-range communication network such as Bluetooth, WiFi direct, or infrared data association (IrDA)) or a second network ED99 (long-range communication network such as a cellular network, Internet, or computer network (LAN, WAN, etc.)). Such above various kinds of communication modules may be integrated as one element (single chip, etc.) or may be implemented as a plurality of elements (a plurality of chips) separately from one another. The wireless communication module ED92 may identify and authenticate the electronic apparatus ED01 in a communication network such as the first network ED98 and/or the second network ED99 by using subscriber information (international mobile subscriber identifier (IMSI), etc.) stored in the subscriber identification module ED96.

The antenna module ED97 may transmit or receive the signal and/or power to/from outside (another electronic apparatus, etc.). An antenna may include a radiator formed as a conductive pattern formed on a substrate (PCB, etc.). The antenna module ED97 may include one or more antennas. When the antenna module ED97 includes a plurality of antennas, from among the plurality of antennas, an antenna that is suitable for the communication type used in the communication network such as the first network ED98 and/or the second network ED99 may be selected by the communication module ED90. The signal and/or the power may be transmitted between the communication module ED90 and another electronic apparatus via the selected antenna. Another component (RFIC, etc.) other than the antenna may be included as a part of the antenna module ED97.

Some of the elements may be connected to one another via the communication method among the peripheral devices (bus, general purpose input and output (GPIO), serial peripheral interface (SPI), mobile industry processor interface (MIPI), etc.) and may exchange signals (commands, data, etc.).

The command or data may be transmitted or received between the electronic apparatus ED01 and the external electronic apparatus ED04 via the server ED08 connected to the second network ED99. Other electronic apparatuses ED02 and ED04 may be the devices that are the same as or different kinds from the electronic apparatus ED01. All or some of the operations executed in the electronic apparatus ED01 may be executed in one or more devices among the other electronic apparatuses ED02, ED04, and ED08. For example, when the electronic apparatus ED01 has to perform a certain function or service, the electronic apparatus ED01 may request one or more other electronic apparatuses to perform some or entire function or service, instead of executing the function or service by itself. One or more electronic apparatuses receiving the request execute an additional function or service related to the request and may transfer a result of the execution to the electronic apparatus ED01. To do this, for example, a cloud computing, a distributed computing, or a client-server computing technique may be used.

Figure 16:
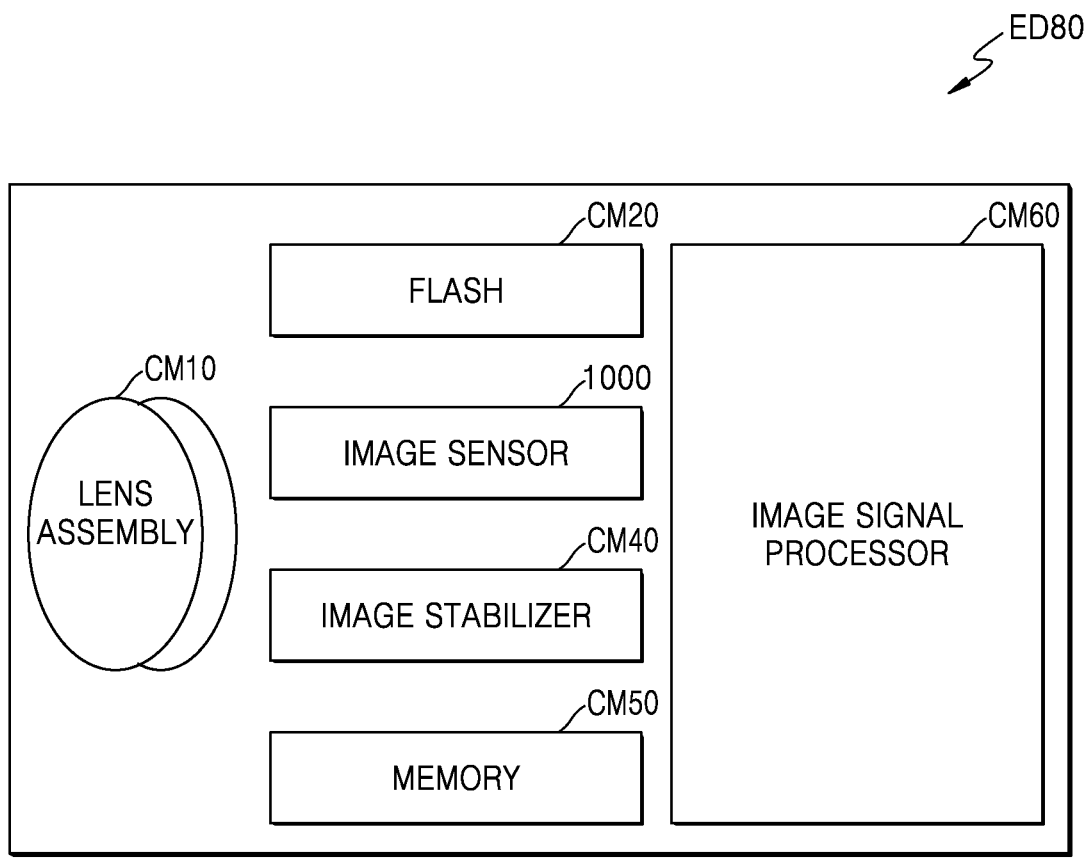
FIG. 16 is a schematic block diagram of a camera module in FIG. 15.

FIG. 16 is a block diagram showing the camera module ED80 of FIG. 15. Referring to FIG. 16, the camera module ED80 may include a lens assembly CM10, a flash CM20, an image sensor 1000 (the image sensor 1000 of FIG. 1), an image stabilizer CM40, a memory CM50 (buffer memory, etc.), and/or an image signal processor CM60. The lens assembly CM10 may collect light emitted from an object, that is, an object to be captured. The camera module ED80 may include a plurality of lens assemblies CM10, and in this case, the camera module ED80 may include a dual camera module, a 360-degree camera, or a spherical camera. Some of the plurality of lens assemblies CM10 may have the same lens properties (viewing angle, focal distance, auto-focus, F number, optical zoom, etc.) or different lens properties. The lens assembly CM10 may include a wide-angle lens or a telephoto lens.

The flash CM20 may emit light that is used to strengthen the light emitted or reflected from the object. The flash CM20 may include one or more light-emitting diodes (red-green-blue (RGB) LED, white LED, infrared LED, ultraviolet LED, etc.), and/or a Xenon lamp. The image sensor 1000 may be the image sensor described above with reference to FIG. 1, and converts the light emitted or reflected from the object and transferred through the lens assembly CM10 into an electrical signal to obtain an image corresponding to the object. The image sensor 1000 may include one or more selected sensors from among image sensors having different properties such as an RGB sensor, a black-and-white (BW) sensor, an IR sensor, and a UV sensor. Each of the sensors included in the image sensor 1000 may be implemented as a charge coupled device (CCD) sensor and/or a complementary metal oxide semiconductor (CMOS) sensor.

The image stabilizer CM40, in response to a motion of the camera module ED80 or the electronic apparatus ED01 including the camera module ED80, moves one or more lenses included in the lens assembly CM10 or the image sensor 1000 in a certain direction or controls the operating characteristics of the image sensor 1000 (adjusting of a read-out timing, etc.) in order to compensate for a negative influence of the motion. The image stabilizer CM40 may sense the movement of the camera module ED80 or the electronic apparatus ED01 by using a gyro sensor or an acceleration sensor arranged in or out of the camera module ED80. The image stabilizer CM40 may be implemented as an optical type.

The memory CM50 may store some or entire data of the image obtained through the image sensor 1000 for next image processing operation. For example, when a plurality of images are obtained at a high speed, obtained original data (Bayer-patterned data, high resolution data, etc.) is stored in the memory CM50, and a low resolution image is only displayed. Then, original data of a selected image (user selection, etc.) may be transferred to the image signal processor CM60. The memory CM50 may be integrated with the memory ED30 of the electronic apparatus ED01, or may include an additional memory that is operated independently.

The image signal processor CM60 may perform image treatment on the image obtained through the image sensor 1000 or the image data stored in the memory CM50. The image treatments may include a depth map generation, a three-dimensional modeling, a panorama generation, extraction of features, an image combination, and/or an image compensation (noise reduction, resolution adjustment, brightness adjustment, blurring, sharpening, softening, etc.). The image signal processor CM60 may perform controlling (exposure time control, read-out timing control, etc.) of the elements (image sensor 1000, etc.) included in the camera module ED80. The image processed by the image signal processor CM60 may be stored again in the memory CM50 for additional process, or may be provided to an external element of the camera module ED80 (e.g., the memory ED30, the display device ED60, the electronic apparatus ED02, the electronic apparatus ED04, the server ED08, etc.). The image signal processor CM60 may be integrated with the processor ED20, or may be configured as an additional processor that is independently operated from the processor ED20. When the image signal processor CM60 is configured as an additional processor separately from the processor ED20, the image processed by the image signal processor CM60 undergoes through an additional image treatment by the processor ED20 and then may be displayed on the display device ED60.

The electronic apparatus ED01 may include a plurality of camera modules ED80 having different properties or functions. In this case, one of the plurality of camera modules ED80 may include a wide-angle camera and another camera module ED80 may include a telephoto camera. Similarly, one of the plurality of camera modules ED80 may include a front camera and another camera module ED80 may include a rear camera.

Figure 17:
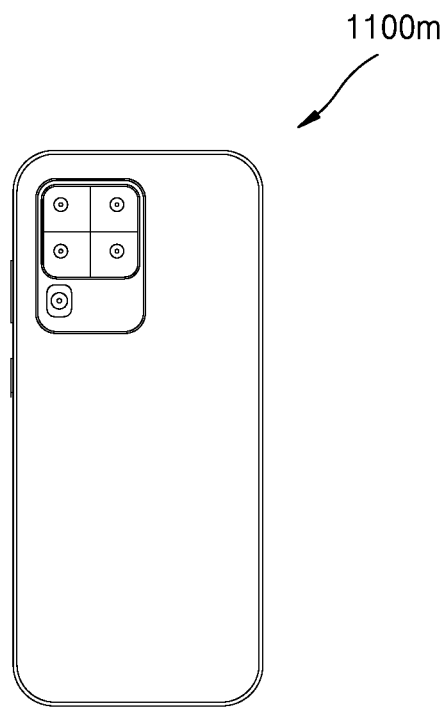
FIGS. 17 to 26 are diagrams showing various examples of an electronic apparatus to which an image sensor according to one or more example embodiments is applied.
Figure 18:
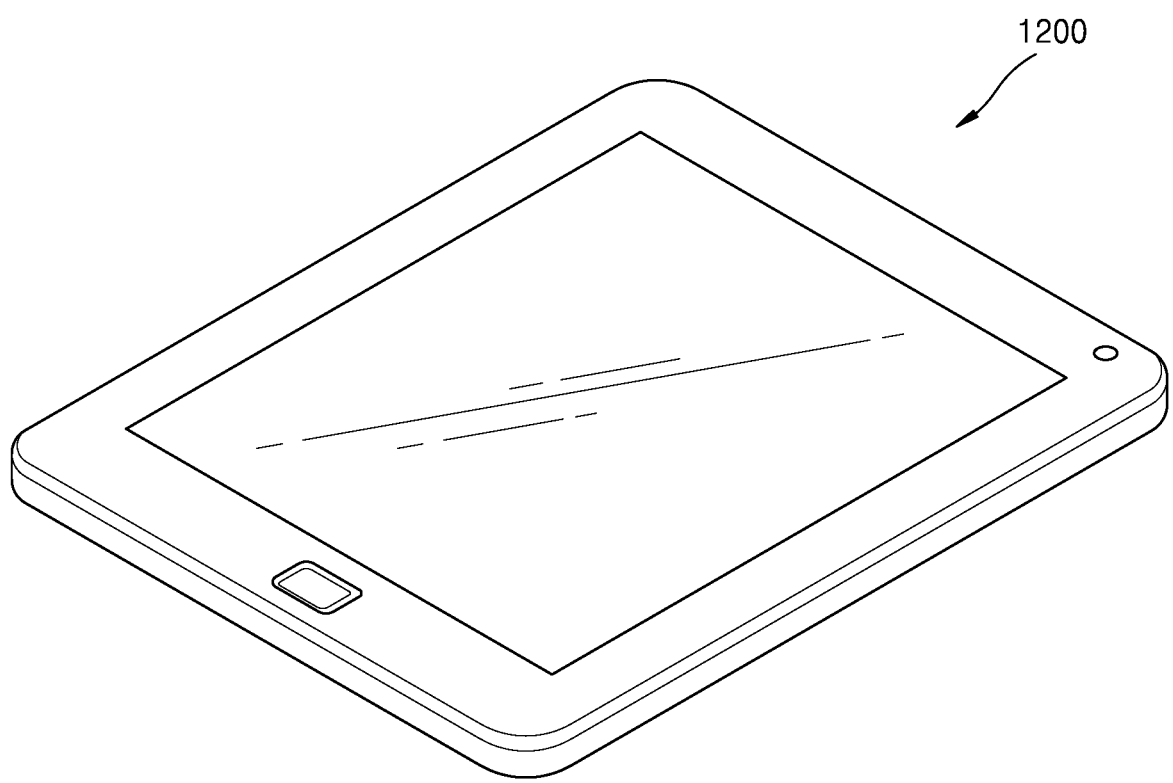
Figure 19:
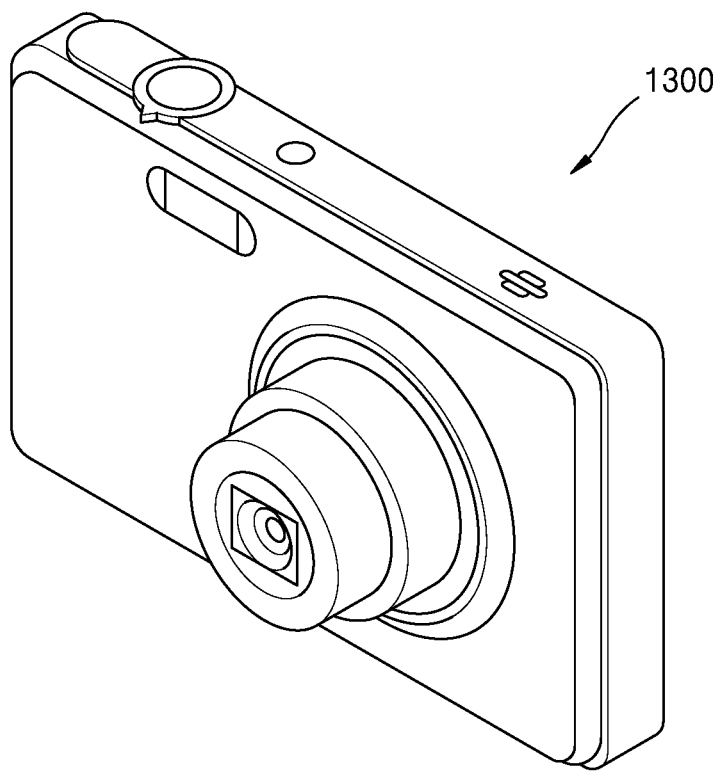
Figure 20:
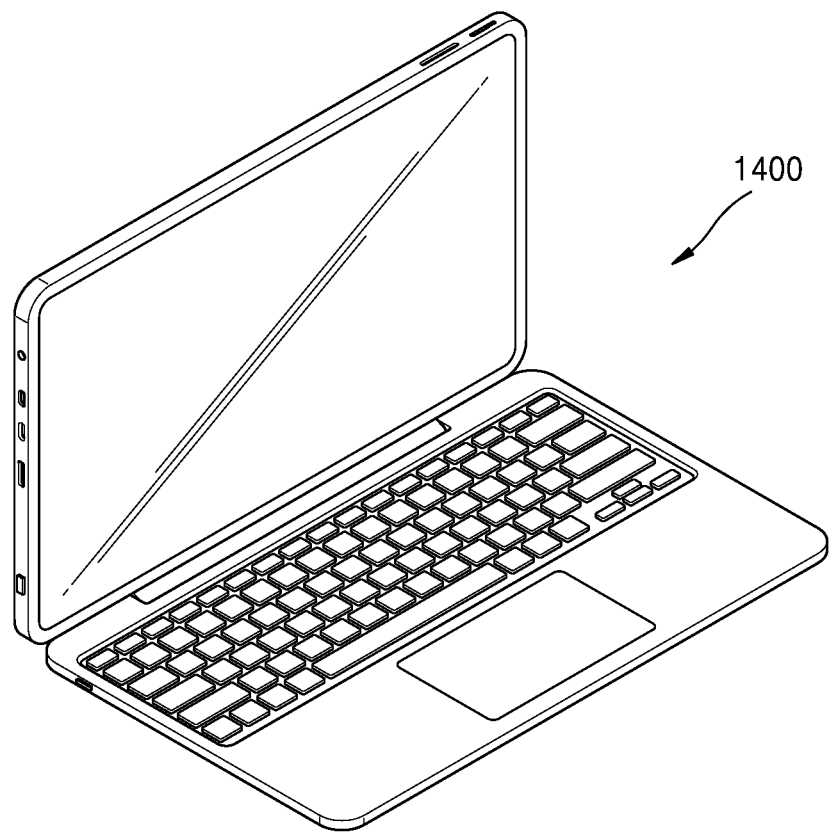
Figure 21:
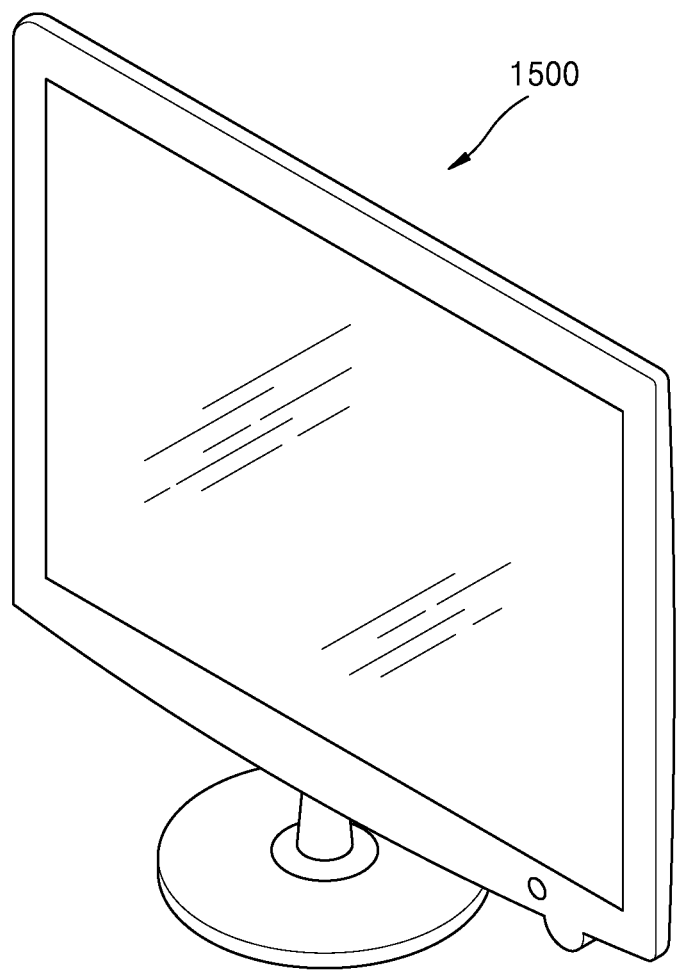

The image sensor 1000 according to the example embodiments may be applied to a mobile phone or a smartphone 1100m shown in FIG. 17, a tablet or a smart tablet 1200 shown in FIG. 18, a digital camera or a camcorder 1300 shown in FIG. 19, a laptop computer 2400 shown in FIG. 20, or a television or a smart television 1500 shown in FIG. 21. For example, the smartphone 1100m or the smart tablet 1200 may include a plurality of high-resolution cameras each including a high-resolution image sensor. Depth information of objects in an image may be extracted, out focusing of the image may be adjusted, or objects in the image may be automatically identified by using the high-resolution cameras.

Figure 22:
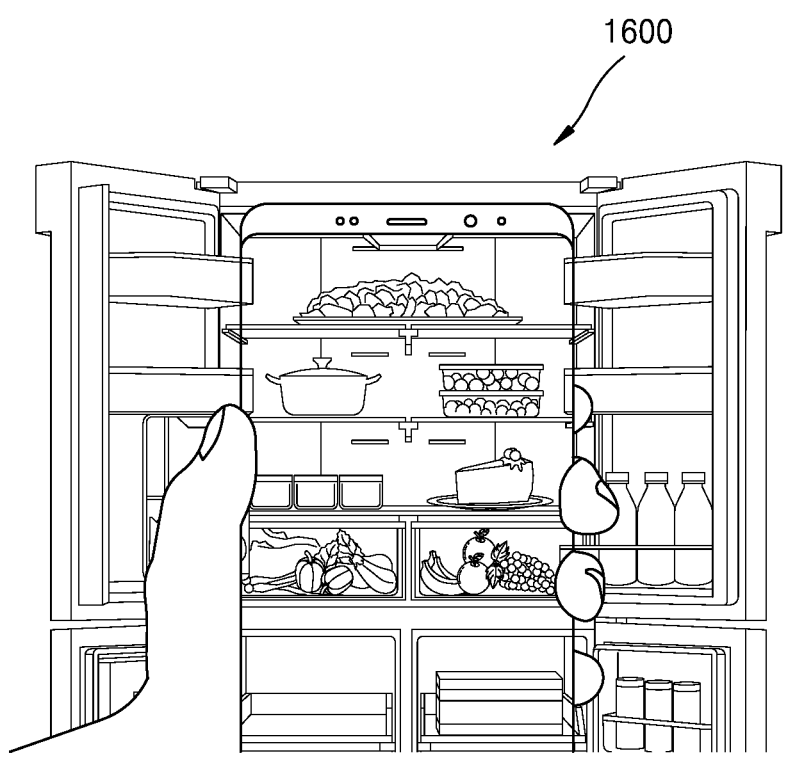
Figure 23:
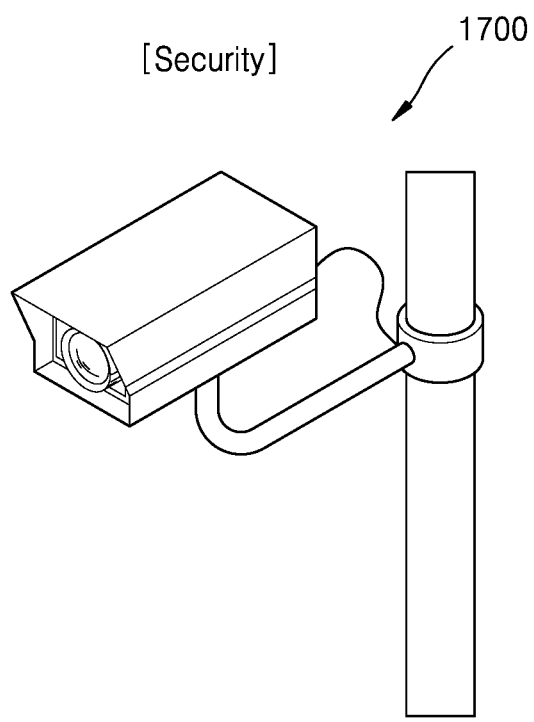
Figure 24:
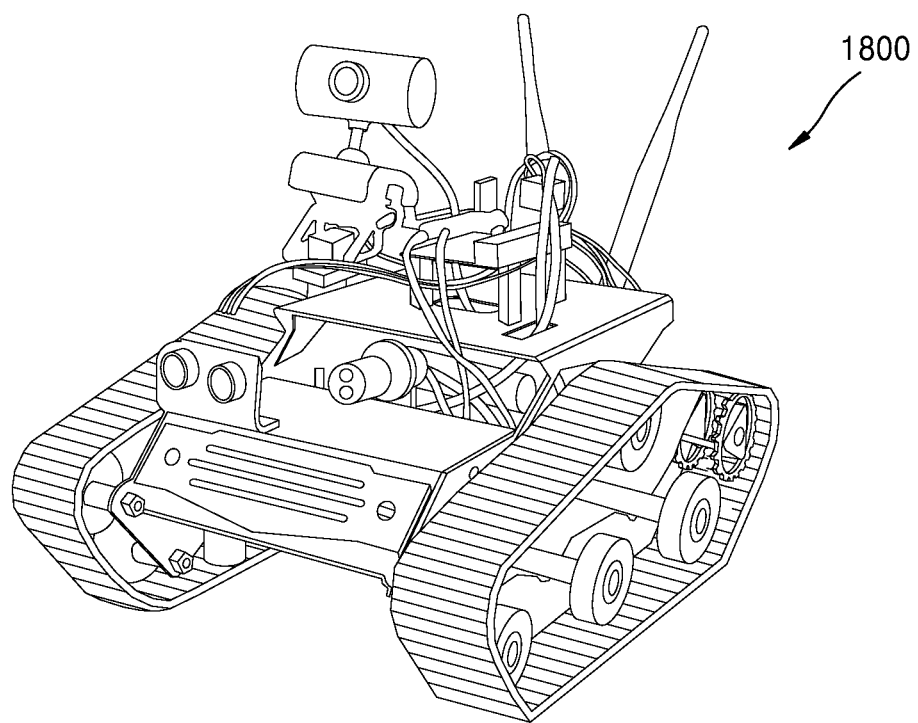
Figure 25:
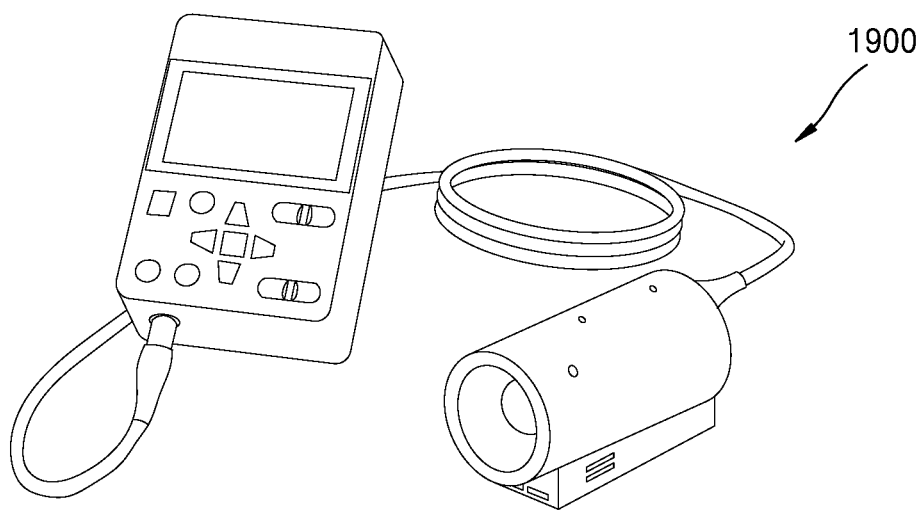

Also, the image sensor 1000 may be applied to a smart refrigerator 1600 shown in FIG. 22, a surveillance camera 1700 shown in FIG. 23, a robot 1800 shown in FIG. 24, a medical camera 1900 shown in FIG. 25, etc. For example, the smart refrigerator 1600 may automatically recognize food in the refrigerator by using the image sensor, and may notify the user of an existence of a certain kind of food, kinds of food put into or taken out, etc. through a smartphone. Also, the surveillance camera 1700 may provide an ultra-high-resolution image and may allow the user to recognize an object or a person in the image even in dark environment by using high sensitivity. The robot 1900 may be input to a disaster or industrial site that a person may not directly access, to provide the user with high-resolution images. The medical camera 1900 may provide high-resolution images for diagnosis or surgery, and may dynamically adjust a field of view.

Figure 26:
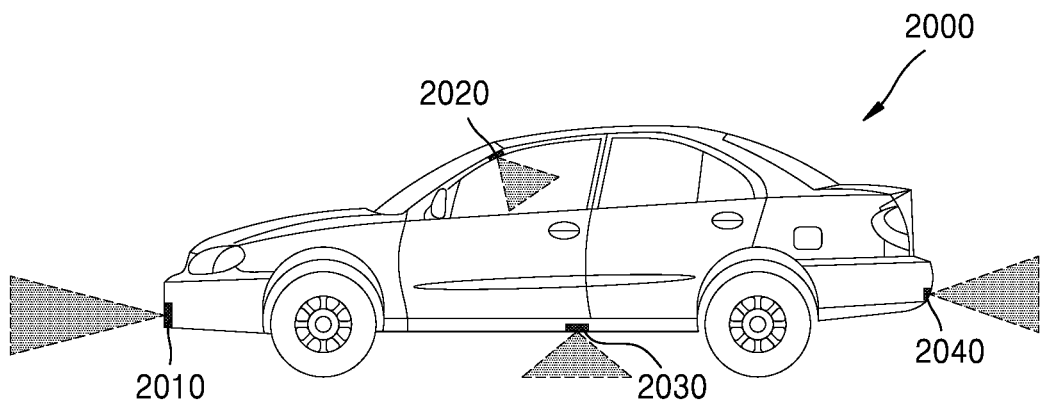

Also, the image sensor 1000 may be applied to a vehicle 2000 as shown in FIG. 26. The vehicle 2000 may include a plurality of vehicle cameras 2010, 2020, 2030, and 2040 at various locations. Each of the vehicle cameras 2010, 2020, 2030, and 2040 may include the image sensor according to the one or more example embodiments. The vehicle 2000 may provide a driver with various information about the interior of the vehicle 2000 or the periphery of the vehicle 2000 by using the plurality of vehicle cameras 2010, 2020, 2030, and 2040, and may provide the driver with the information necessary for the autonomous travel by automatically recognizing an object or a person in the image.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. An image sensor comprising:
   a sensor substrate including a plurality of first pixels configured to sense light of a first wavelength and a plurality of second pixels configured to sense light of a second wavelength that is different from the first wavelength;
   a spacer layer that is transparent and provided on the sensor substrate; and
   a color separating lens array provided on the spacer layer, the color separating lens array configured to change a phase of the light of the first wavelength and condense the light of the first wavelength on each of the first pixels, and change a phase of the light of the second wavelength and condense the light of the second wavelength on each of the second pixels,
   wherein the color separating lens array comprises a first color separating lens array layer including a plurality of first nanoposts, a first dielectric material layer provided between the plurality of first nanoposts, and a plurality of first etch prevention patterns provided respectively under the plurality of first nanoposts, and
   wherein the first dielectric material layer includes a first dielectric material having a lower refractive index than the plurality of first nanoposts.

2. The image sensor of claim 1, wherein a first etch prevention pattern, among the plurality of first etch prevention patterns, is provided between a first nanopost, among the plurality of first nanoposts, corresponding to the first etch prevention pattern and the spacer layer.

3. The image sensor of claim 1, wherein each of the plurality of first etch prevention patterns have a thickness of about 3 nm to about 50 nm.

4. The image sensor of claim 1, wherein each of the plurality of first etch prevention patterns have a thickness of about 5 nm to about 15 nm.

5. The image sensor of claim 1, wherein a first width or a first diameter of a first etch prevention pattern, among the plurality of first etch prevention patterns, is greater than a second width or a second diameter of a lower portion of a first nanopost, among the plurality of first nanoposts, corresponding to the first etch prevention pattern.

6. The image sensor of claim 5, wherein the first width or the first diameter of the first etch prevention pattern is about 100 nm to about 500 nm.

7. The image sensor of claim 5, wherein the first width or the first diameter of the first etch prevention pattern is about 1.2 to 2 times greater than the second width or the second diameter of the lower portion of the first nanopost corresponding to the first etch prevention pattern.

8. The image sensor of claim 1, wherein each of the first etch prevention patterns includes at least one material selected from aluminum oxide (AlO), hafnium oxide (HfO), or silicon nitride (SiN).

9. The image sensor of claim 1, wherein an upper surface of the spacer layer is in direct contact with a lower surface of the first dielectric material layer between two adjacent first etch prevention patterns among the plurality of first etch prevention patterns.

10. The image sensor of claim 1,
    wherein the color separating lens array further includes a second color separating lens array layer provided on the first color separating lens array layer,
    wherein the second color separating lens array layer includes a plurality of second nanoposts, and a second dielectric material layer provided between the plurality of second nanoposts, the second dielectric material layer including a second dielectric material having a lower refractive index than the plurality of second nanoposts, and
    wherein arrangement of the plurality of first nanoposts in the first color separating lens array layer is different from arrangement of the plurality of second nanoposts in the second color separating lens array layer.

11. The image sensor of claim 10, wherein the color separating lens array further includes a plurality of second etch prevention patterns provided on the first color separating lens array layer and respectively under the plurality of second nanoposts.

12. The image sensor of claim 11, wherein a third width or a third diameter of a second etch prevention pattern, among the plurality of second etch prevention patterns, is about 1.2 to about 2 times greater than a fourth width or a fourth diameter of a second nanopost, among the plurality of second nanoposts, corresponding to the second etch prevention pattern.

13. The image sensor of claim 11, wherein an upper surface of a first nanopost, among the plurality of first nanoposts, on which a second nanopost, among the plurality of second nanoposts, is not provided, is in direct contact with the second dielectric material layer.

14. The image sensor of claim 11, wherein at least one second nanopost of the plurality of second nanoposts is shifted in a lateral direction with respect to corresponding one or more first nanoposts, among the plurality of first nanoposts.

15. The image sensor of claim 14, wherein a second etch prevention pattern, among the plurality of second etch prevention patterns, is shifted in a lateral direction with respect to a first nanopost, among the plurality of first nanoposts, corresponding a second nanopost, among the plurality of second nanoposts, provided on the second etch prevention pattern, and partially covers an upper surface of the first nanopost under the second etch prevention pattern.

16. The image sensor of claim 14, wherein a second etch prevention pattern, among the plurality of second etch prevention patterns, completely covers an upper surface of a first nanopost, among the plurality of first nanoposts, corresponding a second nanopost, among the plurality of second nanoposts, provided on the second etch prevention pattern.

17. The image sensor of claim 10, wherein the color separating lens array further includes a plurality of second etch prevention patterns provided on the first color separating lens array layer, and the plurality of second etch prevention patterns are respectively provided under the plurality of second nanoposts and on upper surfaces of the plurality of first nanoposts.

18. The image sensor of claim 17, wherein a fifth width or a fifth diameter of a second etch prevention pattern, from among the plurality of second etch prevention patterns, on which a second nanopost, among the plurality of second nanoposts, is not arranged is about 1.2 to about 2 times greater than a sixth width or a sixth diameter of an upper portion of a first nanopost, among the plurality of first nanoposts, provided under the second etch prevention pattern.

19. An electronic apparatus comprising:
an image sensor configured to convert an optical image into an electrical signal;
a processor configured to control operations of the image sensor and to store and output a signal generated by the image sensor; and
a lens assembly configured to provide light from an object to the image sensor,
wherein the image sensor comprises:
a sensor substrate including a plurality of first pixels configured to sense light of a first wavelength and a plurality of second pixels configured to sense light of a second wavelength that is different from the first wavelength;
a spacer layer that is transparent and provided on the sensor substrate; and
a color separating lens array provided on the spacer layer, the color separating lens array configured to change a phase of the light of the first wavelength and condense the light of the first wavelength on each of the first pixels, and change a phase of the light of the second wavelength and condense the light of the second wavelength on each of the second pixels,
wherein the color separating lens array comprises a first color separating lens array layer including a plurality of first nanoposts, a first dielectric material layer provided between the plurality of first nanoposts, and a plurality of first etch prevention patterns provided respectively under the plurality of first nanoposts, and
wherein the first dielectric material layer includes a first dielectric material having a lower refractive index than the plurality of first nanoposts.

* * * * *